(12) United States Patent
Hung

(10) Patent No.: US 11,352,123 B2
(45) Date of Patent: Jun. 7, 2022

(54) WING ASSEMBLY FOR A HIGH ENDURANCE AIRCRAFT

(71) Applicant: Lucas Kai-Luen Hung, Miamisburg, OH (US)

(72) Inventor: Lucas Kai-Luen Hung, Miamisburg, OH (US)

( * ) Notice: Subject to any disclaimer, the term of this patent is extended or adjusted under 35 U.S.C. 154(b) by 187 days.

(21) Appl. No.: 16/452,787

(22) Filed: Jun. 26, 2019

(65) Prior Publication Data

US 2020/0055585 A1 Feb. 20, 2020

Related U.S. Application Data

(60) Provisional application No. 62/812,764, filed on Mar. 1, 2019, provisional application No. 62/799,165, filed on Jan. 31, 2019, provisional application No. 62/691,014, filed on Jun. 28, 2018.

(51) Int. Cl.
*B64C 9/18* (2006.01)
*B64C 9/32* (2006.01)

(52) U.S. Cl.
CPC ............ *B64C 9/18* (2013.01); *B64C 9/323* (2013.01)

(58) Field of Classification Search
CPC .... B64C 9/06; B64C 9/00; B64C 9/12; B64C 9/323
See application file for complete search history.

(56) References Cited

U.S. PATENT DOCUMENTS

| | | | |
|---|---|---|---|
| 2,173,538 A * | 9/1939 | John | B64C 13/00 244/233 |
| 2,279,615 A * | 4/1942 | Bugatti | B64C 13/00 244/217 |
| 2,612,329 A | 9/1952 | Crandall et al. | |
| 2,643,833 A * | 6/1953 | Ambroise | B64C 5/10 244/226 |
| 2,791,385 A | 5/1957 | Johnson | |
| 6,079,672 A * | 6/2000 | Lam | B64C 9/06 244/217 |
| 6,276,641 B1 * | 8/2001 | Gruenewald | B64C 3/48 244/213 |
| 6,554,229 B1 | 4/2003 | Lam et al. | |
| 7,510,151 B2 | 3/2009 | Perez-Sanchez | |

(Continued)

FOREIGN PATENT DOCUMENTS

CN 109334950 A * 2/2019

OTHER PUBLICATIONS

"F4E Slat Operation", Youtube, https://www.youtube.com/watch?v=rdcSAM74Oh4, Feb. 25, 2013, 1 page.

(Continued)

*Primary Examiner* — Richard G Davis
(74) *Attorney, Agent, or Firm* — Daniel F. Nesbitt; Nesbitt IP LLC

(57) ABSTRACT

An airfoil assembly comprising an airplane wing, a spoiler, and a flap for unmanned and high endurance aircraft. The spoiler is located on an upper surface of the airplane wing while the flap is located on a lower surface of the airplane wing. The spoiler and the flap can occupy at least one-third, and up to three-quarters, the chord span of the airplane wing. The spoiler and the flap are both capable of moving upwards and downwards with respect to the airplane wing through their respective frames.

19 Claims, 18 Drawing Sheets

(56) References Cited

U.S. PATENT DOCUMENTS

| | | |
|---|---|---|
| 7,520,471 B2 | 4/2009 | Reckzeh et al. |
| 8,651,430 B2 | 2/2014 | Voss et al. |
| 9,016,638 B2 | 4/2015 | Dahl et al. |
| 9,403,564 B1 | 8/2016 | Al-Huwaider |
| 9,555,875 B2 | 1/2017 | Burchard |
| 9,846,432 B2 * | 12/2017 | Lam .......................... B64C 9/04 |
| 9,873,502 B2 | 1/2018 | Good et al. |
| 2011/0031347 A1 | 2/2011 | Allen |
| 2011/0135472 A1 * | 6/2011 | Cazals ...................... B64C 9/16 |
| | | 416/23 |
| 2012/0056038 A1 | 3/2012 | Grip |

OTHER PUBLICATIONS

Pilot's Handbook of Aeronautical Knowledge "Chapter 6: Flight Controls" (available at https://www.faa.gov/regulations_policies/handbooks_manuals/aviation/phak/media/08_phak_ch6.pdf), 12 pages, Feb. 10, 2017.

National Aeronautics and Space Administration, Museum in a Box Series, "Parts of an Airplane", EP-2010-12-467-HQ , (available at https://www.hq.nasa.gov/office/aero/pdf/parts_of_an_airplane_9-12.pdf), 26 pages, 2010.

SKYbrary Wiki, "Spoilers and Speedbrakes" (available at https://web.archive.org/web/20180408205808/https://skybrary.aero/index.php/Spoilers_And_Speedbrakes), 4 pages, Apr. 8, 2018.

Wikipedia, "Airbrake Air brake (aeronautics) " (available at https://web.archive.org/web/20170331124904/https://en.wikipedia.org/wiki/Air_brake_(aeronautics)), 2 pages, Mar. 17, 2017.

* cited by examiner

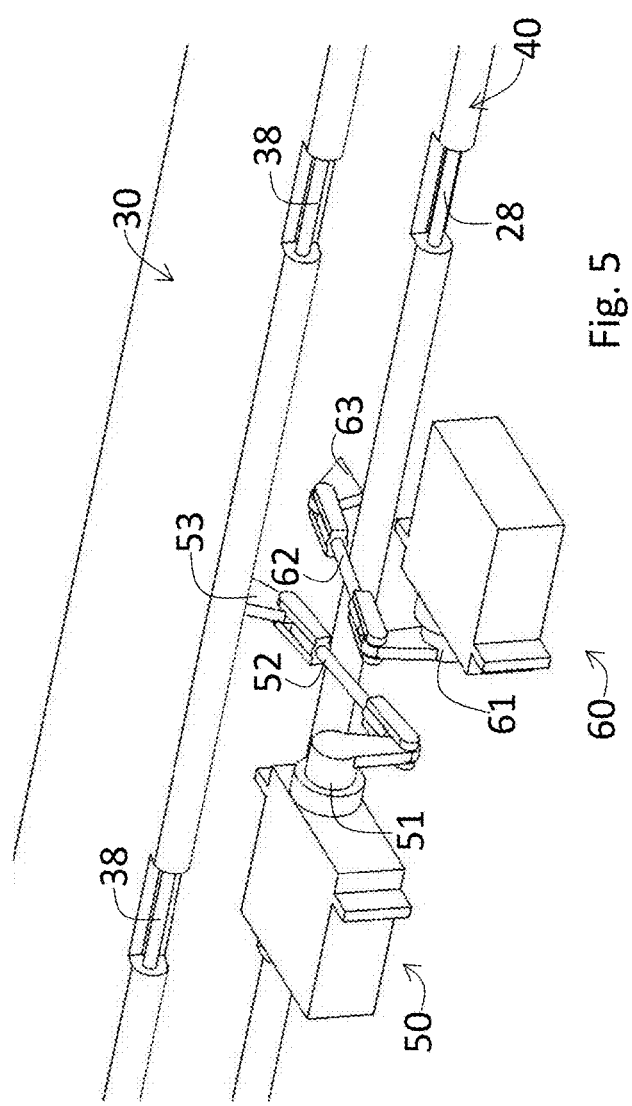
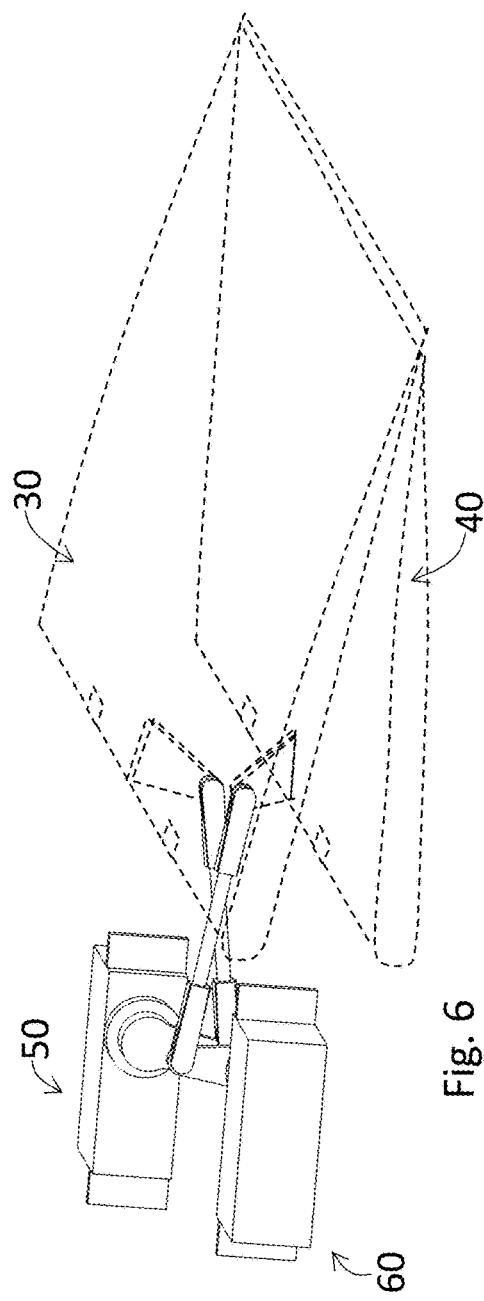

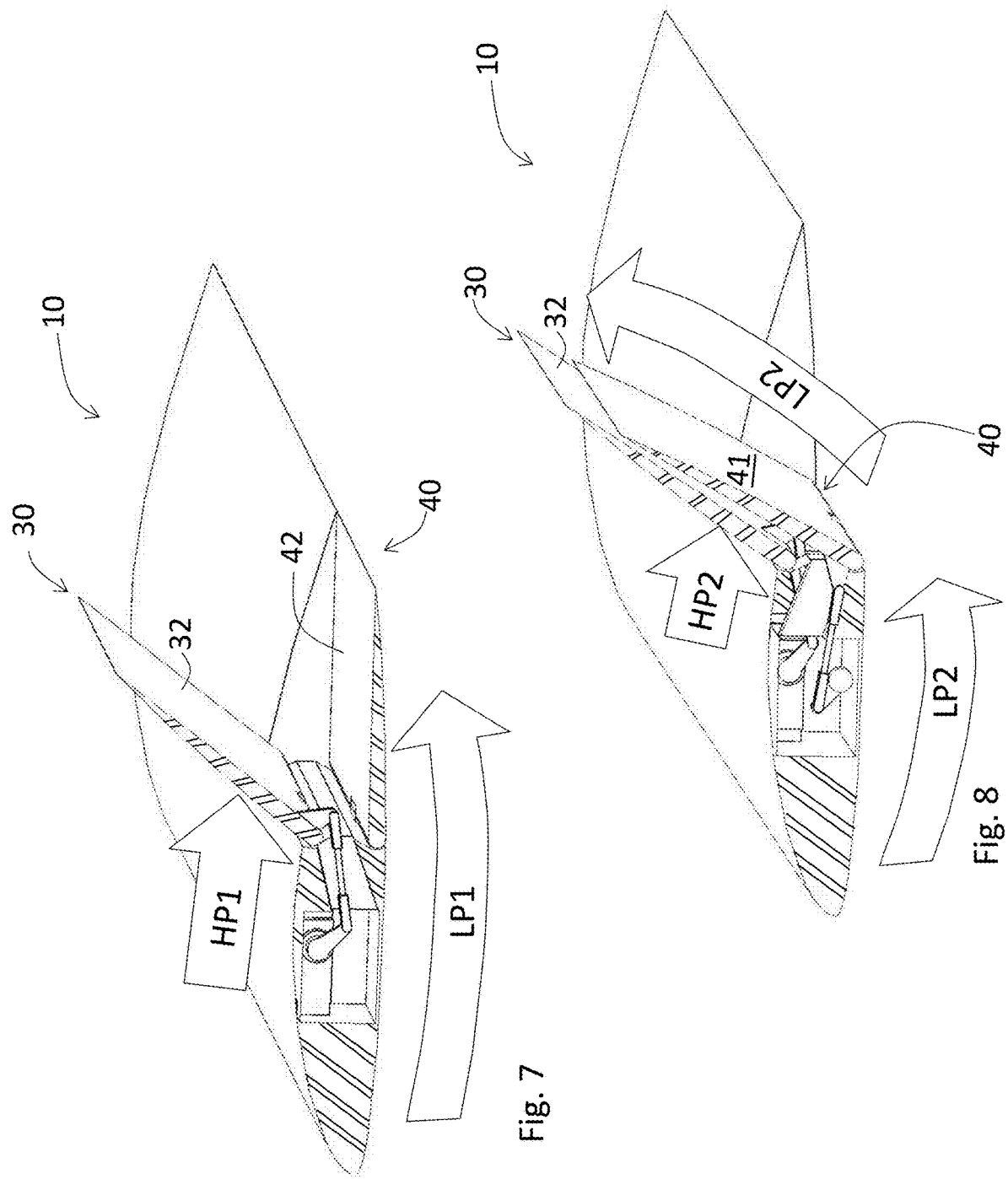

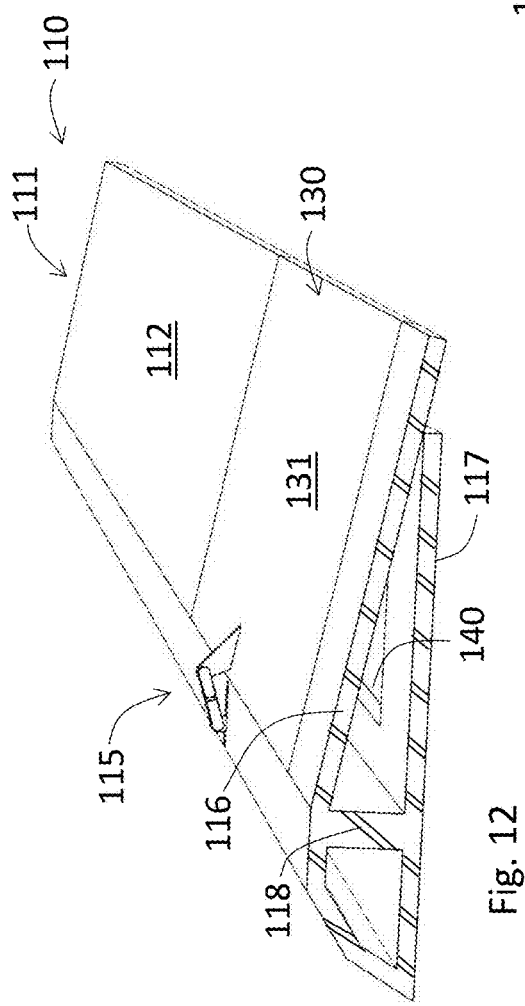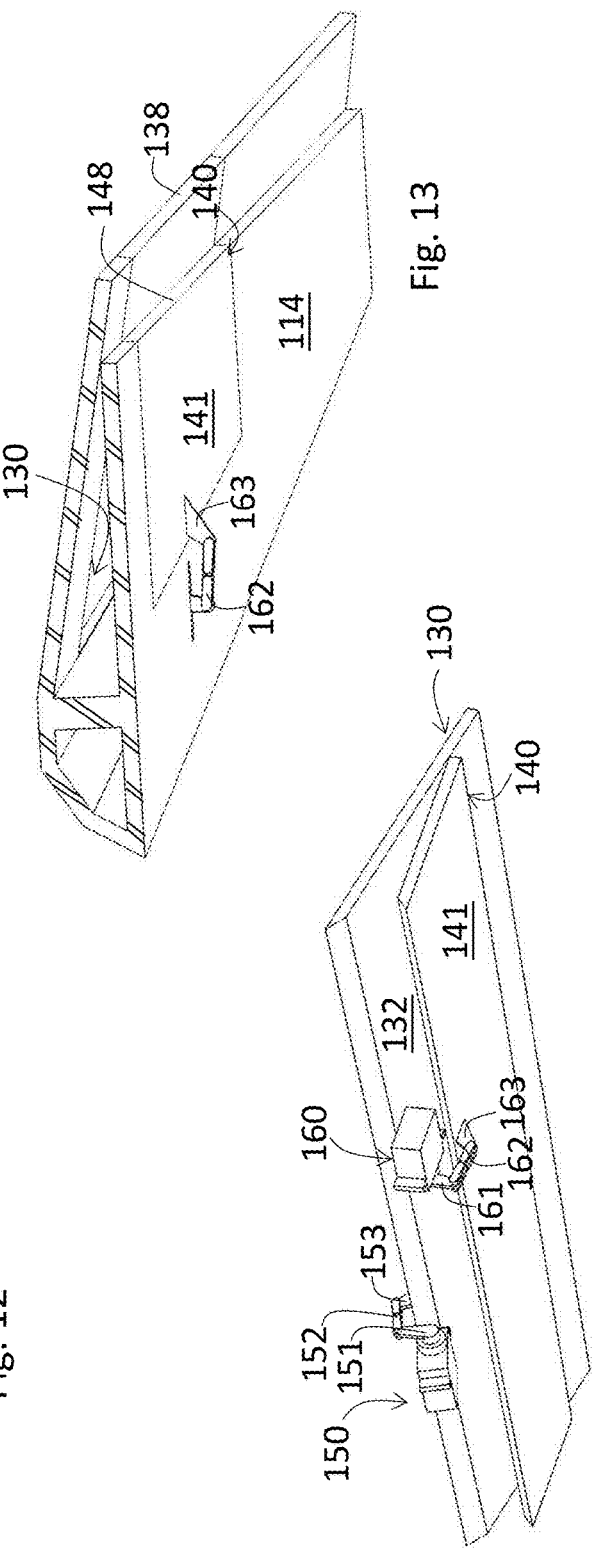

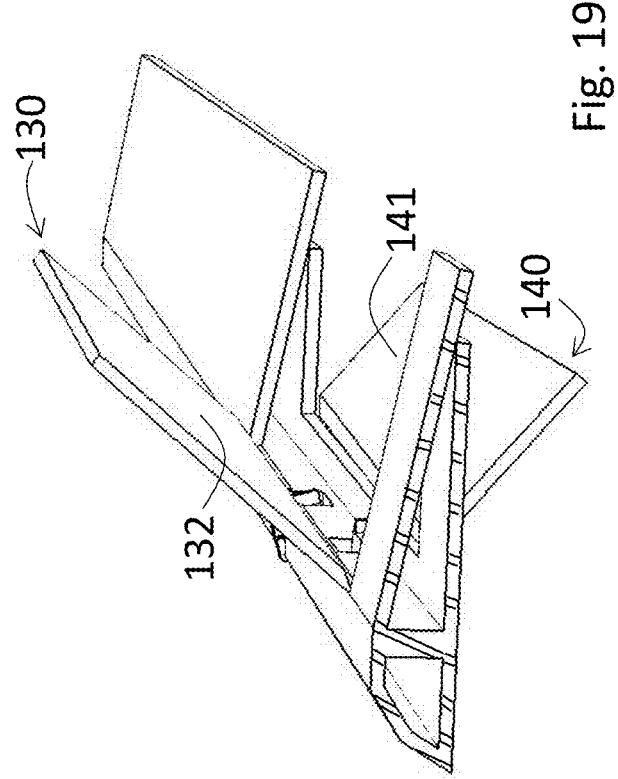

WING ASSEMBLY FOR A HIGH ENDURANCE AIRCRAFT

CROSS REFERENCE TO RELATED APPLICATIONS

This application claims the benefit of U.S. Provisional Application No. 62/691,014 filed Jun. 28, 2018, U.S. Provisional Application No. 62/799,165 filed Jan. 31, 2019, and U.S. Provisional Application No. 62/812,764 filed Mar. 1, 2019, the disclosures of which are incorporated herein by reference in their entireties.

FIELD OF THE INVENTION

The present invention relates to spoilers and flaps in aircrafts.

BACKGROUND OF THE INVENTION

With the advent of airplanes, it has long been the goal and the trend for engineers to monitor, optimize, and improve upon established notions of flight. In the field of aeronautics, many factors come into play when it comes to solving problems prevalent in the field. These factors generally depend upon benefits associated with solving a given problem, but can also depend upon the type or purpose of an aircraft, and other economic considerations as applicable. Some improvements that have been pursued by engineers include increasing the speed or load capacity of the aircraft, if for example the aircraft's primary purpose is to carrying passengers or cargoes in which case there may be a need for passengers or cargo to reach their destinations faster. Here, improvements were usually focused on addressing aerodynamic aspects that sought to provide friction-less trajectories, or aircraft engine efficiency, among other aspects.

With regards to acrobat pilots and their aircrafts, the improvements have rather been distinct. These improvements were focused on addressing needs associated with manipulating a given net weight of an aircraft to provide better maneuverability, or otherwise addressing overall aerodynamic design of the aircraft to provide better laminar airflow surrounding the aircraft. Improvements have also nevertheless been directed to increasing the speed of the aircraft in these cases.

In the military field, the needs have been related to reconnaissance missions, combat missions, ration transport missions, or general surveillance missions. In these cases, these improvements were directed to addressing more minute aspects such as those of achieving, for example, noise-less and vibration-less improvements in the aircraft that may better serve in missions related to reconnaissance or ration transport or surveillance. The speed, net weight, or engine efficiency are also significant needs in military applications.

With respect to aircraft components, each have their own purpose and use. These components generally include the fuselage which comprises the cockpit section, passenger or cargo or equipment section, all of which may be used for case-specific missions; empennage at the tail of the aircraft which further can comprise stabilizers, the rudder, and the elevator; wings or airfoils which provides the highest amount of lift to an aircraft and which further may comprise components like ailerons, flaps, spoilers, slats, like control surfaces, aerodynamic surfaces, auxiliary airfoils, etc. The engine which is usually situated at the wings for passenger aircrafts may depend on the type of the aircraft in question. These components have various functions and if a need arises around those functions, it generally is the case that the improvement may only be addressed to that component. It is also true that multiple components can be affected and changed in order to address a particular need.

One of the main subjects of improvement in the field of aircrafts has been directed towards aircraft control. There have been many improvements directed to aircraft components including those involving ailerons, flaps, elevators, airfoils, and stabilizers. For example, some of these improvements have been disclosed in the following US patents/patent Publications: U.S. Pat. Nos. 2,791,385, 2,612,329, 6,079,672, 6,554,229 B1, U.S. Pat. No. 7,510,151 B2, U.S. Pat. No. 7,520,471 B2, U.S. Pat. No. 8,418,954 B2, U.S. Pat. No. 8,418,968 B2, U.S. Pat. No. 8,651,430 B2, U.S. Pat. No. 9,016,638 B2, U.S. Pat. No. 9,403,564 B1, U.S. Pat. No. 9,555,875 B2, U.S. Pat. No. 9,846,432 B2, U.S. Pat. No. 9,873,502 B2, the disclosures of all of the foregoing are incorporated by reference in their entireties.

Man has generally looked into naturally occurring phenomena to solve engineering problems. In the field of aircrafts, this has been birds. More particularly relevant to our case is the albatross which is supposedly a large high endurance bird with its three and one-half meter wingspan. Adult albatrosses can glide for hundreds of miles at a time, reducing their energy requirement for long flights to a minimum. While large unmanned aerial vehicles (UAVs) like the RQ-4 Global Hawk and the MQ-9 Reaper have exploited the endurance factor of the albatross, they lack one key trait of the bird—short takeoff and landing capabilities. Like most birds, the albatross can land in less than one foot while the MQ-9 Reaper can take approximately three thousand feet of ground roll to come to a complete stop. Even if the MQ-9 was scaled down to the size of the albatross, it would still take five hundred feet to stop. Moreover, improvements in the current art have not yet properly and effectively addressed the problem of aircrafts taking a longer distance both during landing and take-off.

An improvement addressing this problem by substantially reducing the distance it takes for an aircraft to take-off or land can prove immensely useful both for military-purpose aircrafts and civilian-purpose aircrafts. For example, on the military side, having a shorter take-off and landing can mean that a surveillance aircraft or a reconnaissance aircraft can directly benefit from being able to retreat faster even if it has been caught by an enemy radar, in that they can take-off fast and speed away from enemy lines. On the civilian side, this can mean that passengers suffering from taxi-sickness may be better served by less taxi-time. In addition, having a shorter time for take-off and landing affords an aesthetic benefit to the ideal engineer who may wish to add "technical elegance" to his design.

There is, thus, a need for shorter times for aircraft take-off and landing that has wider applications than is currently known, and the current invention seeks to address that need.

SUMMARY OF THE INVENTION

The present invention provides devices and methods for aircrafts to take-off from runways and land on runways in a shorter duration of time.

The present invention provides a spoiler and a flap which can occupy at least 10 percent, and up to three-quarters, including up to two-thirds, of a chord line of an airfoil of an aircraft. Current aircraft typically have a spoiler and/or a flap having a chord span only up to about twenty percent of the chord line of the airfoil or wing.

In one embodiment of the invention, the spoiler and the flap can pivot outwardly like an airbrake, immediately before, as, or immediately after, the aircraft touches the ground, slowing down the aircraft. The increased length of the spoiler and the flap, and by consequence, the larger surface area of their control surfaces, can drastically reduce the runway length needed for takeoff or landing, or both.

The present invention provides a wing assembly for an aircraft, especially a high endurance aircraft. The wing assembly primarily comprises an airplane wing, a spoiler, and a flap. The airplane wing, in turn, includes an upper surface with a spoiler frame, a lower surface with a flap frame, at least one spoiler hinge that is disposed along a forward edge of the spoiler frame, and at least one flap hinge that is disposed along a forward edge of the flap frame. The spoiler of the wing assembly includes a control surface, an interior surface, a forward hinge edge, and a trailing edge. The spoiler is hingedly connected at the forward hinge edge to the spoiler hinge of the airplane wing for pivoting the spoiler within the spoiler frame. The spoiler is configured for movement between a neutral position at which the spoiler control surface is coextensive with the upper surface of the airplane wing, an active spoiler position at which the spoiler has been pivoted outwardly away from a camber line of the airplane wing, and a passive flap position at which the spoiler has been pivoted inwardly toward the camber line of the airplane wing and through the flap frame. The flap includes a control surface, an interior surface, a forward hinge edge, and a trailing edge. The flap is hingedly connected at the forward hinge edge to the flap hinge of the airplane wing for pivoting the flap within the flap frame. The flap is configured for movement between a neutral position at which the flap control surface is coextensive with the lower surface of the airplane wing, an active flap position at which the flap has been pivoted outwardly away from the camber line of the airplane wing, and a passive spoiler position at which the flap has been pivoted inwardly toward the camber line of the airplane wing and through the spoiler frame.

The present invention further provides a wing assembly for an aircraft where the spoiler and the flap are configured for movement to a spoiler function position, at which the spoiler has been pivoted outwardly to the active spoiler position and the flap has been pivoted inwardly through the spoiler frame to the passive spoiler position.

The present invention further provides a wing assembly for an aircraft where the spoiler and the flap are configured for movement to a flap function position, at which the flap has been pivoted outwardly to the active flap position and the spoiler has been pivoted inwardly through the flap frame to the passive flap position.

The present invention further provides a wing assembly for an aircraft where the spoiler and the flap are configured for movement to a spoiler-flap function position, at which the spoiler has been pivoted outwardly to the active spoiler position and the flap has been pivoted outwardly to the active flap position.

In another embodiment of this invention, the control surface of the spoiler and the control surface of the flap can have a chord span of at least one-third, and preferably at least half, and up to two-thirds, of the chord of the wing.

The present invention also provides a wing assembly for an aircraft where the spoiler and the flap are configured for movement to a spoiler function position, at which the spoiler has been pivoted outwardly to the active spoiler position and the flap has been pivoted inwardly through the spoiler frame to the passive spoiler position, where the spoiler and the flap are configured for movement to a flap function position, at which the flap has been pivoted outwardly to the active flap position and the spoiler has been pivoted inwardly through the flap frame to the passive flap position, and where the spoiler and the flap are configured for movement to a spoiler-flap function position, at which the spoiler has been pivoted outwardly to the active spoiler position and the flap has been pivoted outwardly to the active flap position. In another embodiment of this invention, the control surface of the spoiler and the control surface of the flap can have a chord span of preferably at least one-third, and more specifically at least half, but can be up to three-quarters, including up to two-thirds, of the chord of the wing.

In an embodiment of the invention, the wing assembly further includes a spoiler actuator disposed within the airplane wing and configured to move the spoiler between the neutral position, the active spoiler position, and the passive flap position, and a flap actuator disposed within the airplane wing and configured to move the flap between the neutral position, the active flap position, and the passive spoiler position. In another embodiment of the invention, the spoiler actuator and the flap actuator include an actuation means, for example a servo motor for positioning an actuator arm that connects to the spoiler and flap, respectively.

In another embodiment of the invention, the servo motor is controlled by a remote-control system, which can be a radio control system.

In yet another embodiment of the invention, the spoiler is configured for movement to the active spoiler position from the neutral position through a pivot angle of up to about 90 degrees, and the flap is configured for movement to the active flap position from the neutral position through a pivot angle of up to about 90 degrees.

In an embodiment of the invention, the wing assembly is made from one or more materials selected from the group consisting of aluminum and its alloys, steel and its alloys, a composite material, a polymeric material, a thermoplastic material, and a combination thereof. For light, long-endurance aircraft, the wing assembly can be made using a high-pressure fiberglass laminate, made by stacking multiple layers of glass cloth, soaking in epoxy resin, and compressing the resulting material under heat until the epoxy cures (also known as G10), and carbon fiber composites, which are lightweight and resilient. A combination or composite of foam board, fiberglass laminate and carbon fiber materials provide wings and fuselage with improved resilience and lightweight, and allow for the carrying of payloads and other diagnostic or surveillance equipment.

In another embodiment of the invention, the trailing edge of the spoiler overlaps the trailing edge of the flap and defines a trailing edge of the airplane wing in a neutral position.

In yet another embodiment of the invention, the spoiler and the flap of the wing assembly are configured to pivot in tandem to the spoiler function position, or to the flap function position.

In an embodiment of this invention, the means for providing propulsion for the aircraft is motor-driven propeller, as is well known in the art. In one embodiment, the propulsion motor is an electric motor, which drives the shaft of the propeller directly or through a gear box, by well-known means. In an embodiment, the motor can be an electrically powered motor that is controlled by an electronic speed controller (ESC), drawing electrical power from a battery. In some embodiments, the propulsion motor is attached to the fuselage at the nose, to drive a nose-mounted propeller. In some embodiments, the propulsion motor is attached to the fuselage at or behind the tail, and can face backwards to drive a tail-mounted propeller. In some embodiments where the aircraft is made of foam board, the aircraft may not be able to withstand the force of the motor, and in such a case, a wooden motor mount can attach the motor to the fuselage.

The control surface of the spoiler and the control surface of the flap can independently occupy at least 10 percent, and up to three-quarters a chord line of an airfoil of an aircraft. In one embodiment of the invention, an increase in the portion of the chord line that is occupied by the control surface of either or both the spoiler and the flap can affect the design and structural performance of the airfoil. Factors such as aircraft weight, payload, propulsion capacity, in combination with the percentage of the chord line occupied by the spoiler and flap control surfaces, impact the design and types of structural elements of the wing, and particularly of the portions of the wing that span across leading edge to the lateral tips of the wing, ahead of the spoiler and flap frames, such as the spanners. In general, lighter-weight aircraft can perform with less-stringent structural support requirements in the airfoil. Aircraft and the airfoils thereof the present invention, and in particular light weight and high-endurance aircraft, can comprise a control surface of the spoiler and a control surface of the flap that occupy a percentage of the chord line of about 30%, 35%, 40%, 45%, 50% 55%, 60% 65%, or 70%, depending upon the above-mentioned other factors.

The present invention also provides a method to reduce runway time for an aircraft during landing, the method comprising the step of: after the aircraft touches down on the runway, positioning the flap to a passive spoiler position and the spoiler to an active spoiler position; wherein the aircraft's wings are made of an airfoil assembly comprising an airplane wing, a spoiler and a flap; wherein the spoiler has a control surface that is coextensive with an upper surface of the airplane wing, and the flap has a control surface that is coextensive with a lower surface of the airplane wing; and wherein the control surface of the spoiler and the control surface of the flap occupy at least one-third the length of a chord line of the airplane wing. In such method, an angle of attack of the flap in the passive spoiler position with respect to the chord line of the airfoil assembly is in the range between 0°--90°; and an angle of attack of the spoiler in the active spoiler position with respect to the chord line of the airfoil assembly is in the range between 0°-+90°.

The present invention also provides a method to reduce runway time for an aircraft during landing, the method comprising the step of: after the aircraft touches down on the runway, positioning the flap to an active flap position and the spoiler to an active spoiler position; wherein the aircraft's wings are made of an airfoil assembly comprising an airplane wing, a spoiler and a flap; wherein the spoiler has a control surface that is coextensive with an upper surface of the airplane wing, and the flap has a control surface that is coextensive with a lower surface of the airplane wing; and wherein the control surface of the spoiler and the control surface of the flap occupy at least one-third the length of a chord line of the airplane wing. In such method, an angle of attack of the flap in the active flap position with respect to the chord line of the airfoil assembly is in the range between 0°-+90°; and an angle of attack of the spoiler in the active spoiler position with respect to the chord line of the airfoil assembly is in the range between 0°-+90°.

The methods of the invention can include, as the aircraft in flight approaches a runway, simultaneously positioning a flap to an active flap position and a spoiler to a passive flap position. The method can further provide, as the aircraft in flight approaches the runway, an angle of attack of the flap in the active flap position with respect to the chord line of the airfoil assembly is in the range between 0°-+90°; and an angle of attack of the spoiler in the passive flap position with respect to the chord line of the airfoil assembly is in the range between 0°--90°.

The present invention also provides a method to reduce take-off time for an aircraft during taxi, the method comprising the step of: as the aircraft approaches a take-off point from taxi, positioning a flap to an active flap position and a spoiler to a passive flap position; wherein the aircraft's wings are made of an airfoil assembly comprising an airplane wing, a spoiler and a flap; wherein the spoiler has a control surface that is coextensive with an upper surface of the airplane wing, and the flap has a control surface that is coextensive with a lower surface of the airplane wing; and wherein the control surface of the spoiler and the control surface of the flap occupy at least one-third the length of a chord line of the airplane wing.

In another embodiment of the invention, the method further provides in the step: an angle of attack of the flap in the active flap position with respect to the chord line of the airfoil assembly is in the range between 0°-+90°; and an angle of attack of the spoiler in the passive flap position with respect to the chord line of the airfoil assembly is in the range between 0°--90°.

BRIEF DESCRIPTION OF THE FIGURES

FIG. 5 illustrates a front view of the actuators of FIG. 4 in communication with the spoiler and the flap of the airplane wing.

FIG. 6 illustrates the spoiler and the flap in silhouette to better show the actuators in communication with the spoiler and the flap.

FIG. 7 illustrates the spoiler in an active spoiler position, and the flap in a neutral position.

FIG. 8 illustrates a spoiler function position with the spoiler in an active spoiler position, and the flap in a passive spoiler position.

FIG. 12 shows a top sectional and perspective view of a second embodiment of a wing assembly with a spoiler in a neutral position and an actuator for the spoiler extending through a top surface of the wing.

FIG. 13 shows a bottom perspective view of the wing assembly of FIG. 12 with a flap in a neutral position and an actuator for the flap extending through a bottom surface of the wing.

FIG. 14 shows a front view of the actuators for the spoiler and the flap of the wing assembly of FIG. 12.

FIG. 19 shows the wing assembly of FIG. 12 in a spoiler-flap function position, with the spoiler in the active spoiler position and the flap in the active flap position.

DETAILED DESCRIPTION OF THE INVENTION

Figure 1:
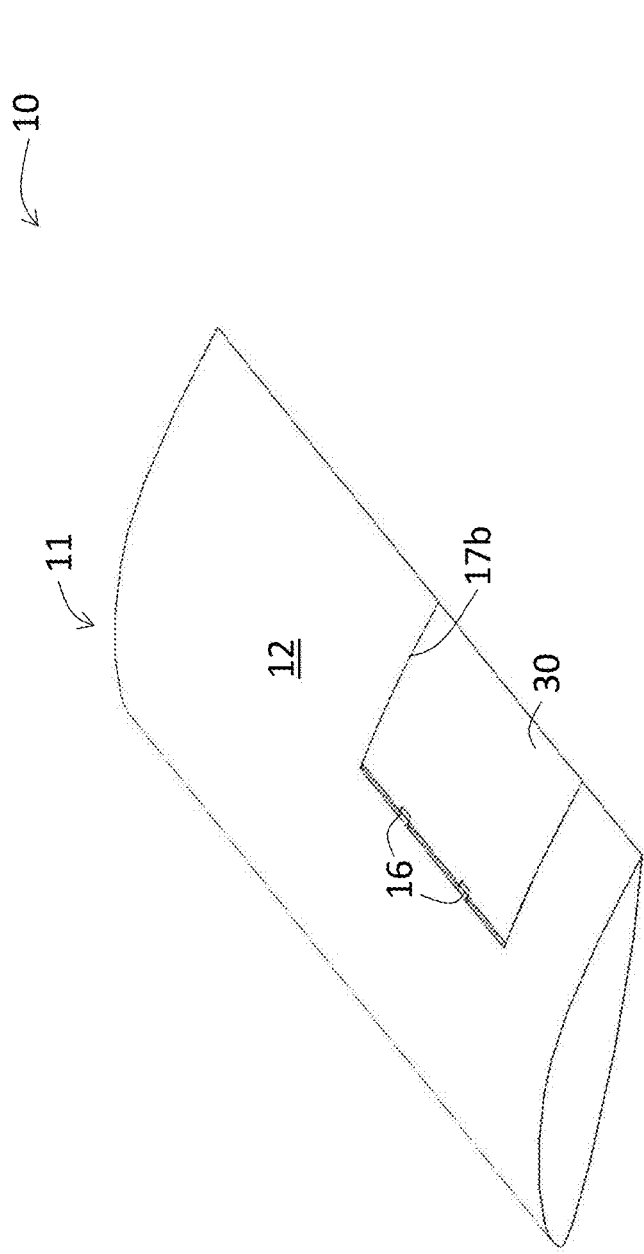
FIG. 1 shows a top perspective view of an embodiment of a wing assembly comprising an airplane wing and a spoiler.

Disclosed herein are embodiments of wing assemblies that affect the lift and drag of aircrafts so that runway time during take-off and runway time during landing is reduced. This detailed description initially sets forth definitions of terms, used herein, that are well-known in the aircraft industry, or to a person skilled in the art. Following that is set forth the invention in detail with respect to figures presented herein.

Definitions

As used herein, "active flap position" refers to a functional position where a given flap is positioned downwards with respect to the camber line of a given airplane wing.

As used herein, "active spoiler position" refers to a functional position where a given spoiler is positioned upwards with respect to the camber line of a given airplane wing.

As used herein, "airfoil" refers to the cross-sectional shape of a wing of an aircraft.

As used herein, "angle of attack" refers to the angle between the chord line of an aircraft and the vector representing the relative motion between the wing and the air through which it is moving.

As used herein, "camber" refers to the asymmetry between two acting surfaces of an airfoil, with an upper surface of a wing being more convex than the lower surface of the wing.

As used herein, "camber line" refers to a curve line that occurs halfway between the upper surface and the lower surface of the airfoil.

As used herein, "chord line" refers to an imaginary straight line joining the leading and trailing edges of an airfoil.

As used herein, "chord span" refers to a percentage of the chord line covered by the control surfaces of a spoiler and a flap.

As used herein, "control surface-based aircraft components" refers to aerodynamic devices that allow a pilot to adjust and control the aircraft's flight and include devices like ailerons, flaps, slats, rudder, and elevators.

As used herein, "drag" refers to a force acting opposite to the relative motion of any object moving with respect to a surrounding fluid (this is sometimes called air resistance, a type of friction, or fluid resistance, another type of friction or fluid friction).

As used herein, "flap function position" refers to a functional position of a given spoiler and a given flap where the spoiler and the flap are both positioned downwards at the same time with respect to the camber line of a given airplane wing.

As used herein, "flap" refers to a type of high-lift device used to increase the lift of a vehicle wing at a given speed. In an embodiment of a fixed-wing aircraft, these flaps are mounted on the wing's trailing edges.

As used herein, "fuselage portion" refers to an aircraft's main body section that generally accommodates the crew, passengers, or cargo.

As used herein, "high endurance aircraft" refers to aircrafts that are capable, for various reasons, of gliding or traversing for longer periods of time in the air as opposed to other aircrafts.

As used herein, "lift" refers to a force acting perpendicular to the flow of a fluid.

As used herein, "neutral position" refers to a rest position of a given spoiler or a given flap, including a position where their control surfaces are coextensive with corresponding surfaces of a given airplane wing.

As used herein, "passive flap position" refers to a functional position where a given spoiler is positioned downwards with respect to the camber line of a given airplane wing.

As used herein, "passive spoiler position" refers to a functional position where a given flap is positioned upwards with respect to the camber line of a given airplane wing.

As used herein, "spoiler function position" refers to a functional position of a given spoiler and a given flap where the spoiler and the flap are both positioned upwards with respect to the camber line of a given airplane wing.

As used herein, "spoiler" refers to a type of device intended to intentionally reduce the lift component of an airfoil in a controlled manner.

As used herein, "spoiler-flap function position" refers to a functional position of a given spoiler and a given flap where the spoiler is positioned upwards and the flap is positioned downwards at the same time with respect to the camber line of a given airplane wing.

As used herein, "taxi" refers to the movement of an aircraft on the ground, under its own power, in contrast to towing or push-back where the aircraft is moved by a tug.

"Present Invention" and "Disclosed Invention" are used interchangeably and they refer to the invention described herein.

FIGS. 1-4 show an embodiment of a wing assembly 10 for a high endurance aircraft. The wing assembly 10 includes an airplane wing 11, a spoiler 30, and a flap 40 while the airplane wing 11 includes an upper surface 12, and a lower surface 14. The airplane wing 11 is typically attached to the fuselage portion of the aircraft and can include various aerodynamic components such as ailerons, flaperons, slats, auxiliary airfoils etc. that may share control surfaces with the upper surface 12 and the lower surface 14. The length of the airplane wing 11 can depend upon the nature, type, and/or purpose of the aircraft in question. In the embodiment shown, the upper surface 12 and the lower surface 14 have similar shapes with regards to their surfaces. The surface areas of the upper surface 12 and the lower surface 14 can be equal in terms of their contact with air during a given airflow scenario. In other embodiments, the upper surface 12 and the lower surface 14 can have different shapes, and their surface areas that have contact with air can also be different.

Figure 3:
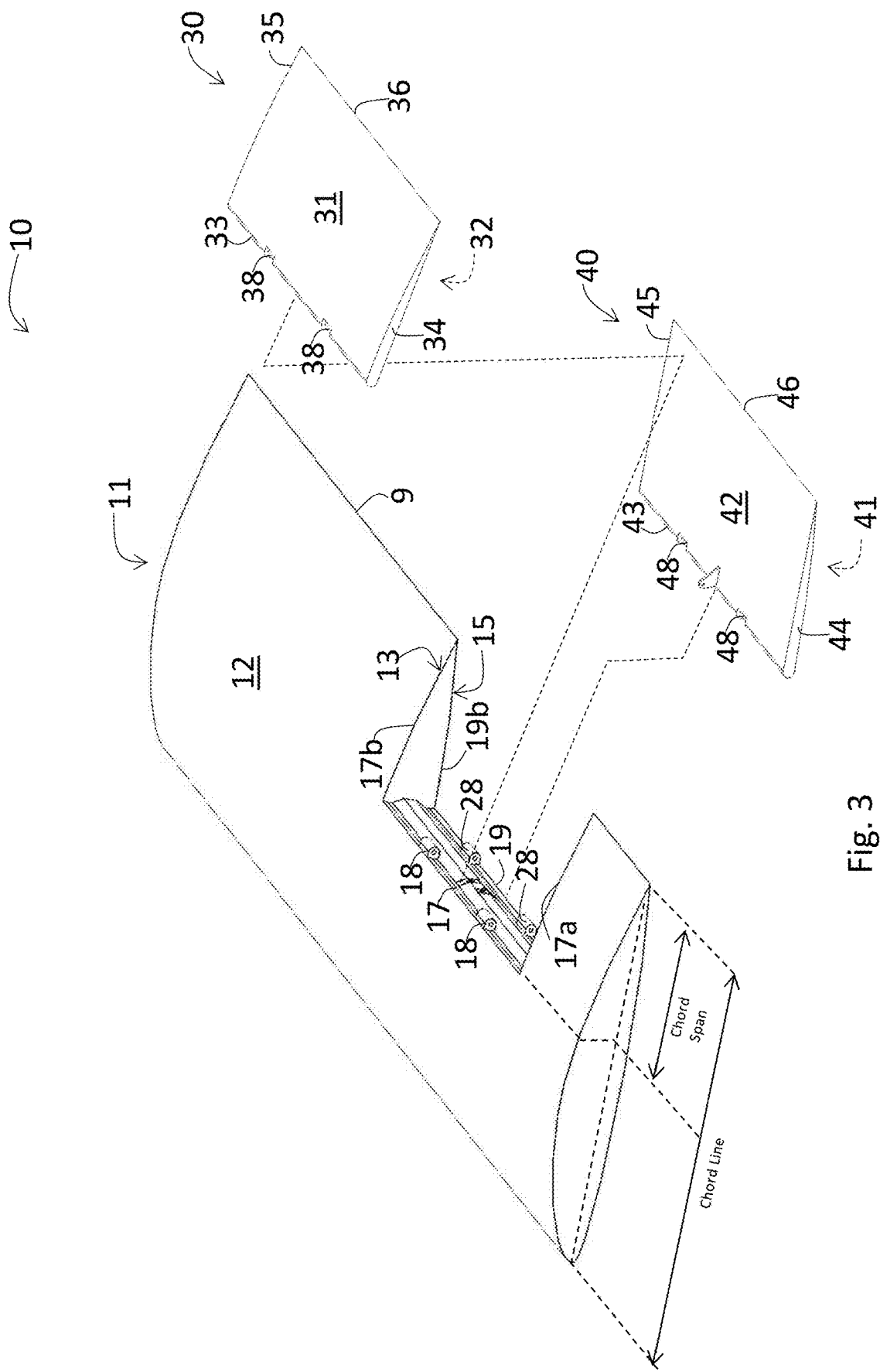
FIG. 3 is an exploded top perspective view of the wing assembly, with the spoiler and the flap illustrated separately from the airplane wing.

The spoiler 30 and the flap 40 are shown in FIG. 3 separately from the airplane wing 11 for illustration purposes. The airplane wing 11 includes a spoiler frame 13 and a flap frame 15. The spoiler frame 13 is defined by a forward edge 17, an inboard side edge 17a, and an outboard side edge 17b. The spoiler frame 13 is a frame-like structure within the upper surface 12 of the airplane wing 11, in which the spoiler 30 registers and remains registered in a neutral position. The spoiler 30 is hingedly connected to the airplane wing 11 by means of a spoiler hinge 16 disposed along the forward edge 17 of the spoiler frame 13.

The spoiler 30 is defined by two surfaces and four peripheral edges. The two surfaces include a control surface 31 that is outward-facing from the wing interior, and an interior surface 32, while the four peripheral edges include a forward hinge edge 33, an inboard lateral edge 34, an outboard lateral edge 35, and a trailing edge 36. Air flows over the control surface 31 to affect a respective lift component or a drag component of the airplane wing 11. The forward hinge edge 33 of the spoiler 30 confronts and communicates hingedly with the forward edge 17 of the spoiler frame 13 through the spoiler hinge 16. In a neutral position, the inboard lateral edge 34 and the outboard lateral edge 35 of the spoiler 30 confront the inboard side edge 17a and the outboard side edge 17b of the spoiler frame 13, respectively. The control surface 31 of the spoiler 30 is also coextensive with the upper surface 12, and the trailing edge 36 is coextensive with the trailing edge 9 of the airplane wing 11, in the same neutral position.

Figure 2:
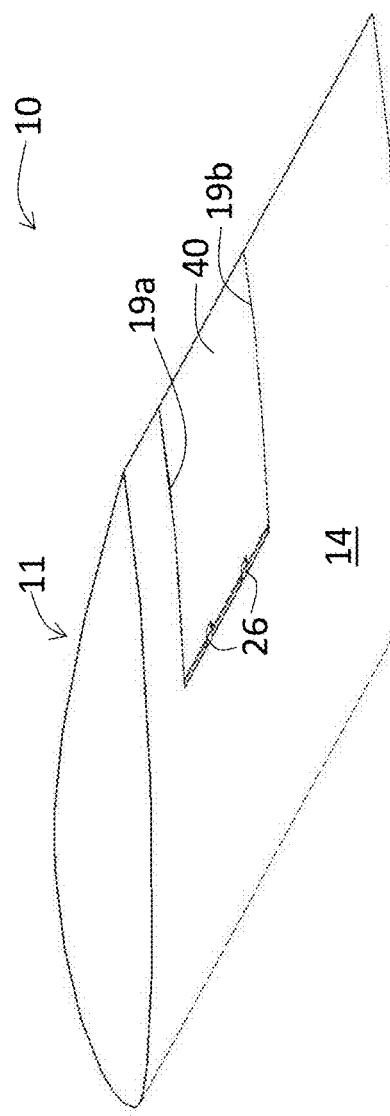
FIG. 2 shows a bottom perspective view of the wing assembly, comprising an airplane wing and a flap.

Like the spoiler frame 13, the flap frame 15 is defined by a forward edge 19, an inboard side edge 19a, and an outboard side edge 19b (FIG. 2). The flap frame 15 is a frame-like structure within the lower surface of the airplane wing 11, in which the flap 40 registers and remains registered in a neutral position. The flap 40 is hingedly connected to the airplane wing 11 by means of a flap hinge 26 disposed along the forward edge 19 of the flap frame 15.

The flap 40 is defined by two surfaces and four peripheral edges. The two surfaces include a control surface 41 which is outward-facing from the wing interior, and an interior surface 42, while the four peripheral edges include a forward hinge edge 43, an inboard lateral edge 44, an outboard lateral edge 45, and a trailing edge 46. Air flows over the control surface 41 to affect a respective lift component or a drag component of the airplane wing 11. The forward hinge edge 43 of the flap 40 confronts and communicates with the forward edge 19 of the flap frame 15 through the flap hinge 26. In a neutral position, the inboard lateral edge 44 and the outboard lateral edge 45 of the flap 40 confront the inboard side edge 19a and the outboard side edge 19b of the flap frame 15, respectively. Also, the control surface 41 of the flap 40 is coextensive with the lower surface 14, and the trailing edge 46 is coextensive with the trailing edge 9 of the airplane wing 11, in the same neutral position. When both the spoiler 30 and the flap 40 are in their respective neutral positions, the interior surface 32 of the spoiler 30, including the trailing edge 36, and the interior surface 42 of the flap 40, including the trailing edge 46, confront each other.

With respect to the airplane wing 11, each of the spoiler 30 and the flap 40 are configured to move either upward or downward, either simultaneously or sequentially in any order, from their respective neutral positions, as is heretofore described. The spoiler 30 and the flap 40 can be of the same size and shape, and the surface areas of their control surfaces (31, 41) can be the same. In the illustrated embodiment, the chord span of the spoiler 30 and the flap 40 each cover about half the chord line of the airplane wing 11. In other embodiments, this chord span can differ. For example, in one embodiment, the chord span of the spoiler 30 and the flap 40 can each cover about one-third to about two-thirds of the chord line of the airplane wing 11. In yet other embodiment, the chord span of the spoiler 30 can be two-thirds the chord line of the airplane wing 11 while the chord span of the flap 40 can be one-third the chord line of the airplane wing 11, or vice versa. In other embodiments, the chord spans of the spoiler 30 and the flap 40 can be varied based on the needs of the aircraft in question while also accounting for practical aspects associated in designing such a spoiler and a flap.

The spoiler 30 along with the spoiler frame 13, and the flap 40 along with the flap frame 15 are designed with respect to aerodynamic considerations (in terms of efficiency, practicality) including those considerations that allow for frictionless movement of air around the airplane wing 11 (to the best extent possible), particularly during steady flight when the spoiler 30 and the flap 40 are in their neutral positions. The airplane wing 11 is designed with little to no air infiltration between the crevices or gaps that could occur between the edges of the spoiler 30 and the spoiler frame 13, and the flap 40 and the flap frame 15.

Referring again to FIG. 3, the spoiler hinge 16 can include a first hinge member 18 that extends from the forward edge 17 of the spoiler frame 13, and a second hinge member 38 that extends from the spoiler hinge edge 33 of the spoiler 30. The first hinge member 18 mates with the second hinge member 38 to form the spoiler hinge 16. Likewise, the flap hinge 26 can include a first hinge member 28 that extends from the forward edge 19 of the flap frame 15, and a second hinge member 48 that extends from the flap hinge edge 43 of the flap 40. The first hinge member 28 mates with the second hinge member 48 to form the flap hinge 26. The geometrical shapes and sizes of the spoiler hinge 16 and the flap hinge 26 can be similar and can correspond to each other in terms of their dimensions. These hinges (16, 26) can be based on any hinge mechanism known in the art. The hinge mechanisms should generally offer the spoiler 30 and the flap 40 movement with little to no friction, but other practical hinge mechanisms can also be used. Some examples of hinge mechanisms include simple plasters or tapes, piano hinges, continuous hinges, butt hinges, spring loaded hinges, fabric or plastic hinges, pinned hinges etc.

Figure 4:
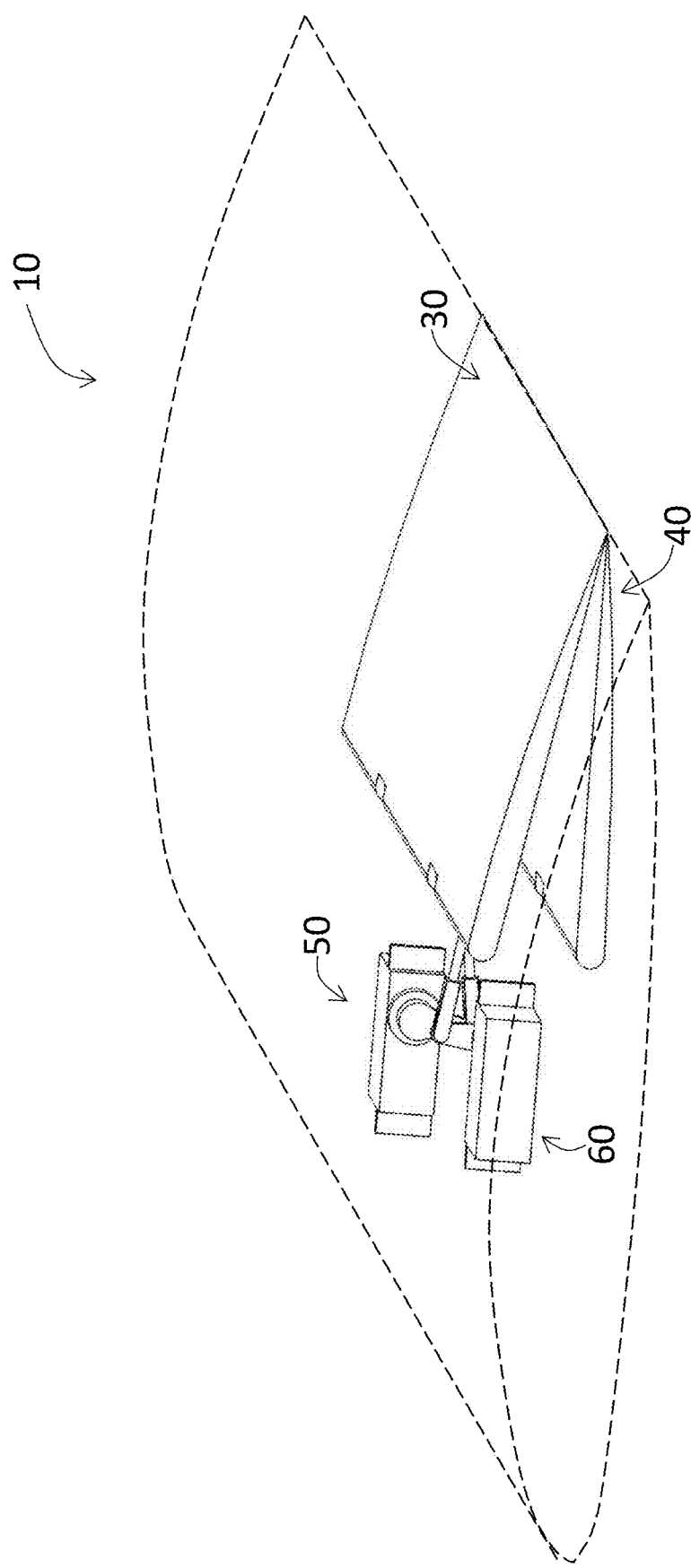
FIG. 4 shows the airplane wing in silhouette to illustrate a pair of actuators that actuate respectively the spoiler and the flap of the wing assembly, with both the spoiler and the flap in a neutral position.

Each of the spoiler 30 and the flap 40 are positioned by one or more actuating mechanisms. Referring now to FIGS. 4-6, two actuating mechanisms, one for the spoiler 30 and one for the flap 40, are shown. A spoiler actuator 50 controls the pivoting movement of the spoiler 30 and a flap actuator 60 controls the pivoting movement of the flap 40. These two actuators (50, 60) are configured to deploy the spoiler 30 and the flap 40 to any necessary deployment angle as heretofore described. In the illustrated embodiment, the spoiler actuator 50 and the flap actuator 60 are wholly disposed within the airplane wing 11 so that they do not interfere with the laminar airflow around the airplane wing 11. In other embodiments, the spoiler actuator 50 and the flap actuator 60 can be affixed to an outer surface, or can extend through an outer surface of the airplane wing 11, though such arrangements may cause turbulence that affects the aerodynamic design of the aircraft.

The spoiler actuator 50 has a spoiler control arm 51 that is connected integratedly with the spoiler 30 through a spoiler connecting link 52. Similarly, the flap actuator 60 has a flap control arm 61 that is connected integratedly with the flap 40 through a flap connecting link 62. The spoiler control arm 51, the flap control arm 61, the spoiler connecting link 52 and the flap connecting link 62 are disposed within the interior of the airplane wing 11. The spoiler actuator 50 and the flap actuator 60 can position the spoiler 30 and the flap 40 respectively, to a deployment angle, including deployment angles associated with the wing assembly 10, including a neutral position, a spoiler function position, a flap function position, or a spoiler-flap function position as heretofore described.

The spoiler actuator 50 drives the spoiler control arm 51 to a rotated position sufficient to generate a respective deployment angle as needed. The spoiler control arm 51 communicates through the spoiler connecting link 52 to force a spoiler lever 53 and pivot the spoiler 30 about the axis of the spoiler hinge 16. Likewise, the flap actuator 60 drives the flap control arm 61 to a rotated position sufficient to generate a respective deployment angle as needed. The flap control arm 61 communicates through the flap connecting link 62 to force a flap lever 63 and pivot the flap 40 about the axis of the flap hinge 26.

The actuator (50 or 60) can be driven by a motor. In an embodiment of the invention, the motor is a servo motor, and controlled for actuation and positioning via manual or remote control. In other embodiments, the actuators (50, 60) can be connected directly to the spoiler 30 and the flap 40, respectively without using a connecting link (52,62). The actuators can also be electronic/electrical based, mechanical/ hydraulic based. The connecting links (52, 62) are elongated and typically have a means for adjusting the length of the link for proper positioning. The levers (53, 63) can generally be of any shape and should be rigid and strong to support movement of either the spoiler 30 or the flap 40, depending upon the type of the material that the wing assembly 10 is made of, and more particularly the purpose of the aircraft.

In one embodiment where the wing assembly 10 can form part of a remote-controlled high endurance aircraft, the control system can include individual components such as a receiver, a transmitter, and servo motors. The receiver and the transmitter can be disposed within the aircraft. One servo motor each for the spoiler and the flap on each wing can be used. Thus, four servo motors for an aircraft with two wings can form part of this embodiment. With regards to the functioning of the aircraft, initially, the receiver can interpret radio signals (for e.g. 2.4 GHz, according to some embodiments) from the transmitter (for e.g. based on Spectrum DX7, according to some embodiments) and can send the signals to the servo motors. These could be in the form of pulse width modulation (PWM) for each control input (the spoiler and flap, for instance). The servo motors interpret the signals and turn their control arms to a desired angle (within a one hundred twenty-degree arc, according to some embodiments). In other embodiments, each servo motor's control arm can be connected to their corresponding control surfaces by a stiff wire to pivot the control surface in sync with the servo motor.

In another embodiment, an actuator can comprise a single actuator assembly wherein a single actuator provides pivoting and positioning of both the spoiler 30 and the flap 40 as to their respective deployment positions. In other embodiments, the actuator can also be of the following type: embedded microcircuits inside the control arms and the connecting links associated with the movement member of either the spoiler 30 or the flap 40 which is flexible and which is capable of becoming rigid enough to withstand control surface load such that the electromagnetic activity that occurs at the control arm and the connecting link can suffice to pivot the spoiler 30 and the flap 40 to their respective positions.

FIGS. 7-8 illustrate functional positions of the spoiler 30 and the flap 40 with FIG. 7 particularly showing an active spoiler position of the spoiler 30, and FIG. 8 showing the spoiler function position. The airplane wing 11 starts in a neutral position such as in FIG. 1, where the aircraft with the wing assembly 10 is typically in steady flight. In this position, air surrounding the airplane wing 11 tends to stick to its surface due to the Coanda Effect. The Coanda effect refers to the tendency of a fluid to stick to a convex surface during the fluid's travel through or around the convex surface. The aircraft with the wing assembly 10 can be fixed with an appropriate propeller to allow the aircraft to propagate through air. In some embodiments, the present invention can be fitted onto a propeller-less aircraft, or a glider.

In FIG. 7, the spoiler actuator 50 has been actuated to pivot the spoiler 30 upwards, to an active spoiler position, at a positive deployment angle within a range of 0°-90° with respect to the chord line of the airplane wing 11, while the flap 40 remains in its neutral position. This creates a high-pressure area HP1 in front of the spoiler 30 with respect to the ambient low-pressure area LP1 that exists below the flap 40 and at the front portion of the airplane wing 11 corresponding to the flap 40. Here, a resultant drag force occurs that affects the wing assembly 10.

In FIG. 8, the flap actuator 60 has been actuated to pivot the flap 40 upwards to a passive spoiler position, at a negative deployment angle within a range of 0°-90° with respect to the chord line. FIG. 8 illustrates the wing assembly 10 in a spoiler function position, with the spoiler in an active spoiler position and the flap in a passive spoiler position. This creates a high-pressure area HP2 in front of the spoiler 30 and a low-pressure area LP2 below the flap 40 and at the front portion of the airplane wing 11 corresponding to the flap 40. The low pressure from the low-pressure area LP2 is not the ambient low pressure from the low-pressure area LP1 since the pivoted position of the flap 40 affects the pressure distribution at the front portion of the airplane wing 11 corresponding to the flap 40. Here, a resultant lift force, directed downwards with respect to the airplane wing 11, occurs that affects the wing assembly 10.

Figure 9:
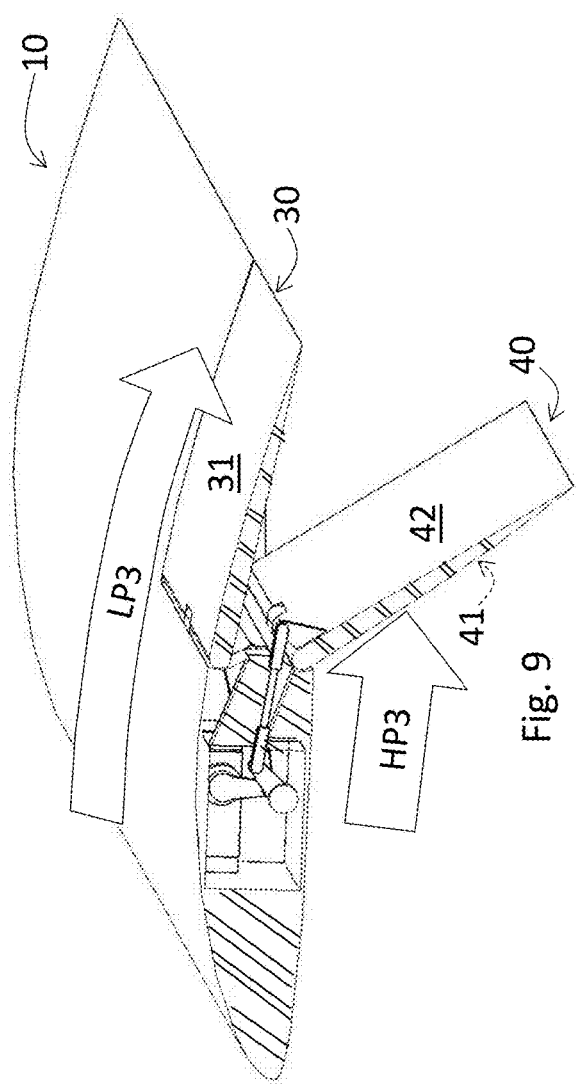
FIG. 9 illustrates the flap in an active flap position, and the spoiler in a neutral position.
Figure 10:
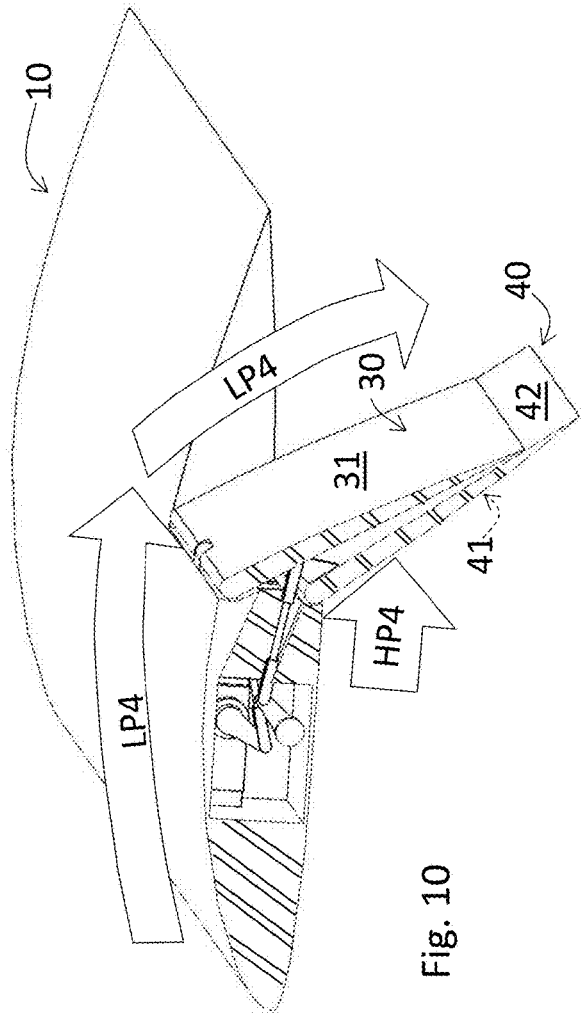
FIG. 10 illustrates a flap function position with the flap in an active flap position, and the spoiler in a passive flap position.

FIGS. 9-10 illustrate functional positions of the spoiler 30 and the flap 40 with FIG. 9 particularly showing an active flap position of the flap 40, and FIG. 10 showing the flap function position. In FIG. 9, the flap actuator 60 has been actuated to pivot the flap 40 downwards, to an active flap position, at a positive deployment angle within a range of 0°-90° with respect to the chord line of the airplane wing 11, while the spoiler 30 remains in its neutral position. This creates a high-pressure area HP3 in front of the flap 40 with respect to the ambient low-pressure area LP3 that exists above the spoiler 30 and at the front portion of the airplane wing 11 corresponding to the spoiler 30. Here, a resultant lift force occurs that affects the wing assembly 10.

In FIG. 10, the spoiler actuator 50 has been actuated to pivot the spoiler 30 downwards to a passive flap position at a negative deployment angle within a range of 0°-90° with respect to the chord line of the airplane wing 11. FIG. 10 illustrates the wing assembly 10 in a flap function position, with the flap in an active flap position and the spoiler in a passive flap position. This creates a high-pressure area HP4 in front of the flap 40 and a low-pressure area LP4 at the spoiler 30 and at the portion of the airplane wing 11 corresponding to the spoiler 30. The low pressure LP4 is not the ambient pressure like LP3 since the pivoted position of the spoiler 30 affects the pressure distribution at the front portion of the airplane wing 11 corresponding to the spoiler 30. Here, a resultant lift force, directed upwards with respect to the airplane wing 11, occurs that affects the wing assembly 10.

Figure 11:
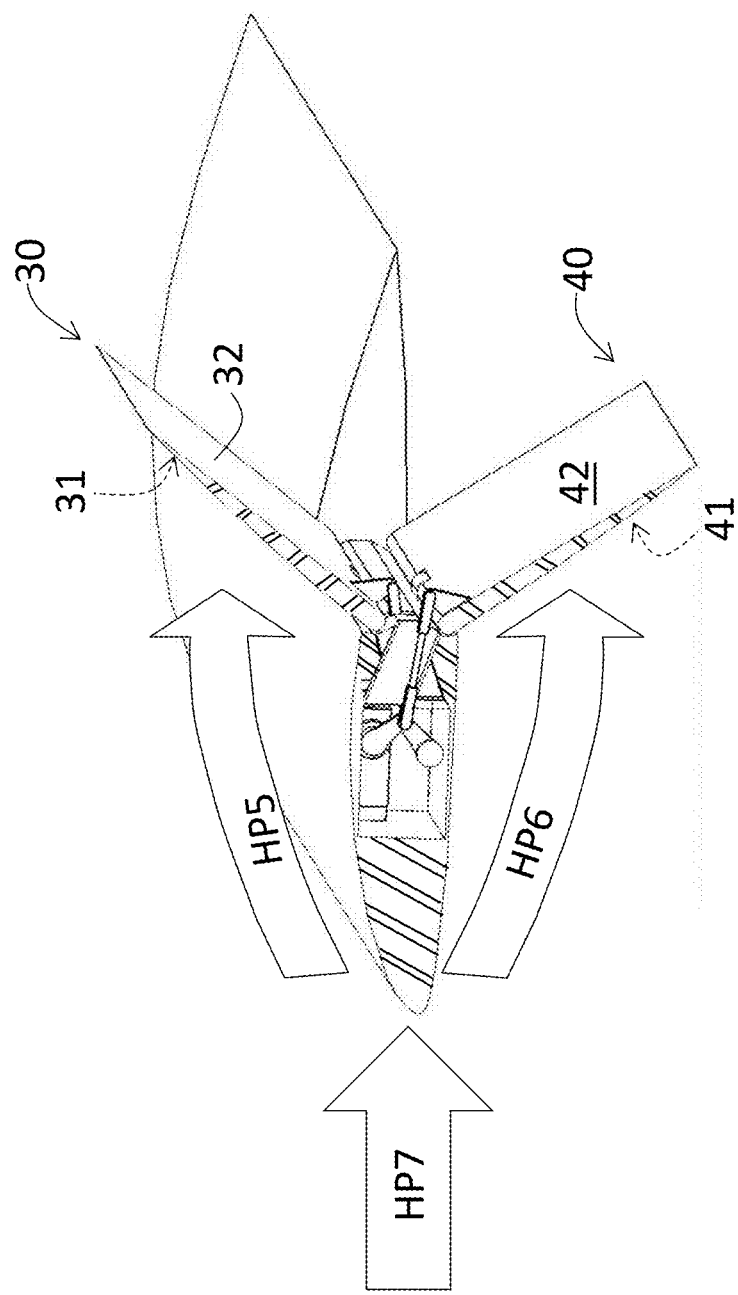
FIG. 11 illustrates a spoiler-flap function position with the spoiler in the active spoiler position and the flap in the active flap position.

FIG. 11 illustrates a spoiler-flap function position of the wing assembly 10 in which the spoiler actuator 50 rotates the spoiler 30 to an active spoiler position while the flap actuator 60 rotates the flap 40 to an active flap position. In the illustrated embodiment, the spoiler 30 and the flap 40 can be actuated simultaneously or sequentially in any order. As a result, high pressure areas HP5, HP6, HP7, are created suddenly in front of the spoiler 30, the flap 40, and the wing portion corresponding to the spoiler 30 and flap 40 respectively as shown. One function of this position is to provide brakes by generating large amounts of drag during flight, taxi, landing or takeoff of the aircraft.

These positions of the spoiler 30 and the flap 40 mentioned above can be utilized and manipulated by an aircraft to achieve lift-to-drag ratios as needed.

In one embodiment for the operation of the spoiler and flap system of the present invention, and where the spoiler 30 and the flap 40 both cover about two-thirds the chord line of the airplane wing 11, the flap 40 is deployed first during flight. When the flap 40 is deployed to a deployment angle (for example, of about 45°), the extensive lift and the added drag allows the aircraft to approach the runway during landing at a steep descent angle without gaining any excess speed. Since one-half of the wing's lift is generated in the front part of the airplane wing 11, a stall is not as sudden as may be expected.

In an alternative embodiment for the operation of the spoiler and flap system, where, as or after the flap 40 is deployed to a deployment angle (for example, of about 45°), the spoiler is also deployed to a passive flap position, such as shown in FIG. 10, where the additional lift and drag permit steeper approaches toward the runway without gaining any excess speed.

After the aircraft touches the ground, thereafter or immediately, the spoilers and flaps are positioned into a spoiler function position, where in the spoiler 30 is positioned to an active spoiler position and the flap 40 is positioned to a passive spoiler position. This prevents the corresponding front portion of the airplane wing 11 from generating lift and create large amounts of drag, thereby slowing down the aircraft and shortening the ground roll of the aircraft. In an alternative embodiment, the latter position can involve the flap 40 retreating to a neutral position with the spoiler 30 remaining in the active spoiler position, while serving the same purpose as above.

Similarly, in yet another embodiment, the spoiler-flap function position as illustrated in FIG. 11 or FIG. 19 can also be utilized in the above methodology of landing an aircraft. In the second stage after the deployment of flap 40 and after the aircraft touches the ground, the spoiler-flap function position can be deployed. At this stage, the spoiler 30 and flap 40 would be simultaneously positioned to an active spoiler position and an active flap position respectively (but can also be deployed sequentially in any order). This position prevents the airplane wing 11 from generating lift and creates large amount of drag as in the above scenario, thereby slowing the aircraft and shortening the ground roll.

The positions of the spoiler 30 and the flap 40 as heretofore described cannot only be utilized for shorter take-off and shorter landing distance, but can also be utilized for other purposes such as those associated with acrobatic feats.

FIGS. 12-19 show an alternative embodiment of the present invention, showing a wing assembly 110 comprising an airplane wing 111, a spoiler 130, and a flap 140 in various configurations. In this embodiment, the wing assembly 110 is generally made of rigid or resilient material. The wing 111 includes a forward portion 115, an upper panel 116 having an upper surface 112, and a lower panel 117 having a lower surface 114. In the illustrated embodiment, the forward portion 115 includes a single vertical rib 118 that, in combination with the panels 116, 117, embody most of the wing structure, without other structural elements such as ribs and spanners. The spoiler 130 and the flap 140 have chord spans at least two-thirds, and up to about three-quarters, of the chord line of the wing 111.

Figure 16:
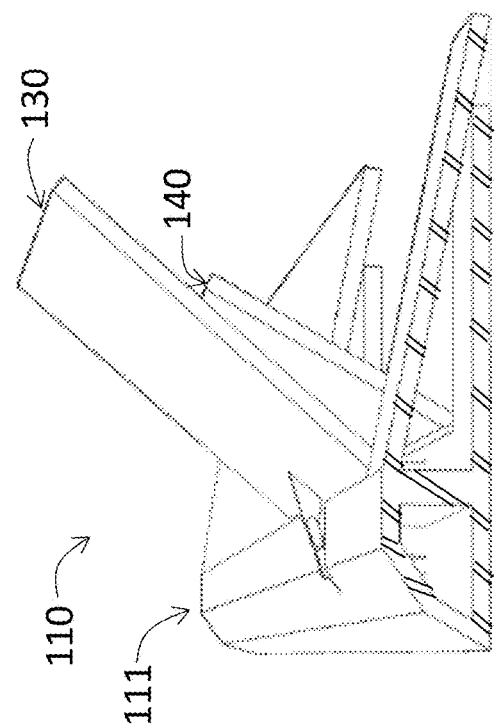
FIG. 16 shows a spoiler function position of the wing assembly of FIG. 12 with the spoiler in an active spoiler position, and the flap in a passive spoiler position.
Figure 15:
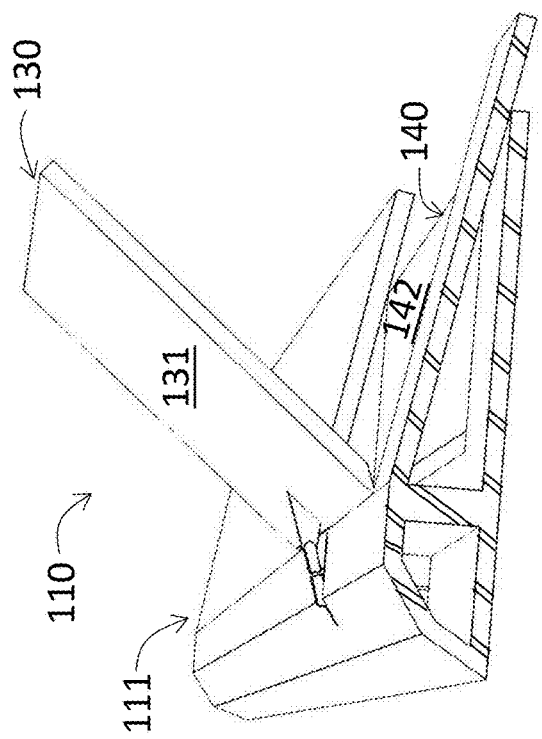
FIG. 15 shows the wing assembly of FIG. 12 with the spoiler in an active spoiler position, and the flap in a neutral position.
Figure 18:
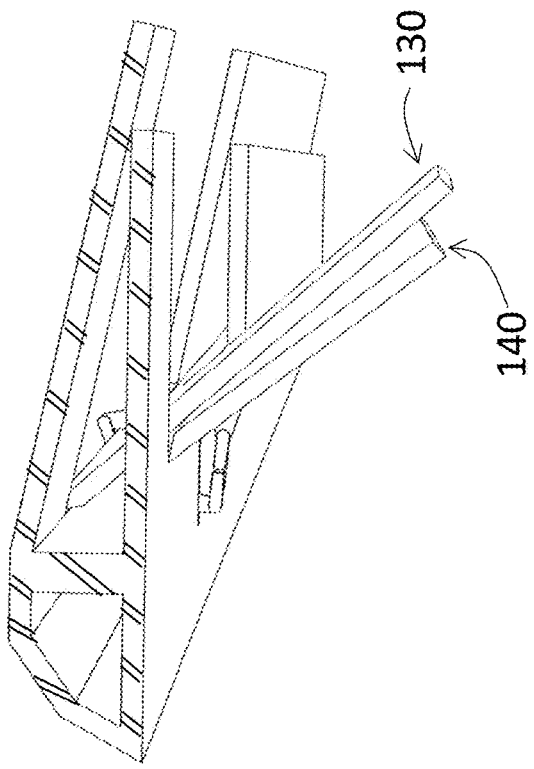
FIG. 18 shows a flap function position of the wing assembly of FIG. 12 with the flap in an active flap position, and the spoiler in a passive flap position.
Figure 17:
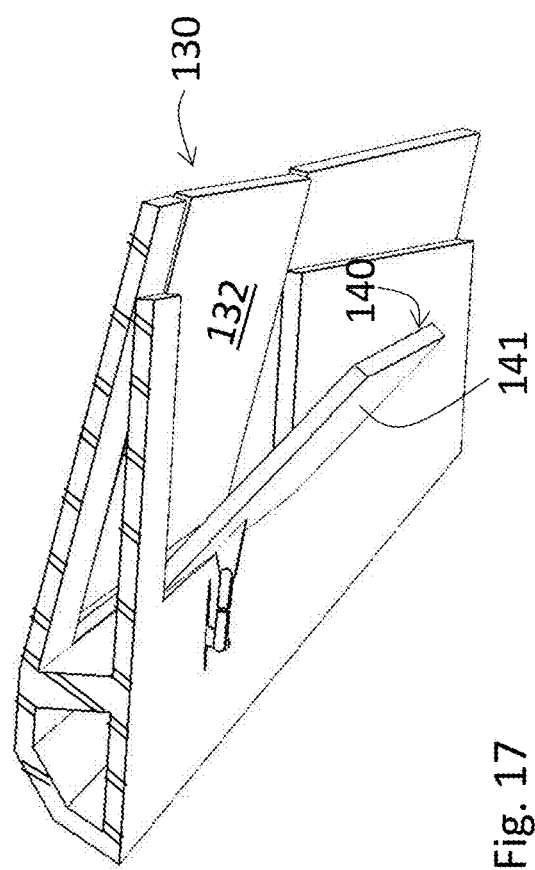
FIG. 17 shows the wing assembly of FIG. 12 with the flap in an active flap position, and the spoiler in a neutral position.

FIGS. 12 and 13 show the spoiler 130 and the flap 140 whose controls surfaces (131, 141) are coextensive with the upper surface 112 and the lower surface 114 of the airplane wing 111 respectively. Specifically, this embodiment illustrates that the trailing edges (138, 148) of the spoiler 130 and the flap 140 respectively, need not confront, register or align with each other as was indicated in the aforementioned embodiment shown in FIG. 4. FIG. 14 shows a spoiler actuator 150 for actuating the spoiler 130 and a flap actuator 160 for actuating the flap 140. FIG. 15 shows the spoiler 130 in an active spoiler position while the flap 140 is in a neutral position. FIG. 16 shows the spoiler 130 in an active spoiler position with the flap 140 in a passive spoiler position. FIG. 17 shows the flap 140 in an active flap position with the spoiler 130 in a neutral position. FIG. 18 shows the flap 140 in an active flap position and the spoiler 130 in a passive flap position. FIG. 19 shows the spoiler 130 and the flap 140 in a spoiler-flap function position, with the spoiler 130 in the active spoiler position and the flap 140 in the active flap position. With respect to the airplane wing 111, both the spoiler 130 and the flap 140 are configured to move upwards or downwards, either simultaneously or sequentially in any order, from their respective neutral positions. The functions of the embodiment described in FIGS. 15-19 mirror the functions of the embodiment described in FIGS. 7-11 respectively.

The wing assemblies disclosed herein can be part of a manned aircraft or an unmanned aircraft. The wing assemblies disclosed herein can typically be used for both wings of an aircraft, although other configurations are envisioned. The wing assemblies disclosed herein can be made of any resilient and durable material known in the art including aluminum and its alloys, steel and its alloys, titanium and its alloys, composite materials, or a combination thereof. The wing assemblies disclosed herein can also be made of Styrofoam, wood, paper, plastic, rubber, fabric or a combination thereof. The material of the wing assemblies disclosed herein can also depend upon the nature, type, or purpose of the aircraft in question.

As shown in the test results of the Second Embodiment of an Unmanned Aircraft, the present invention can provide a reduction in in-flight aircraft acceleration, deceleration, and a reduction in landing approach distance. By reducing the in-air acceleration, the spoiler and flap system of the invention will enable aircraft to approach a runway at a steeper descent angle without excessively increasing their linear acceleration, and still land in a shorter distance as a result of the reduced ground roll distance effect of the invention. This would enable an aircraft to start an approach closer to an airport, fly higher over the surrounding area prior to descent, and land in a shorter distance. For commercial aircraft, incorporating the spoiler and flap system of the invention may reduce noise pollution for areas around an airport and reduce the necessary runway length, freeing that space for other uses. Military aircraft could benefit as well. Reduced ground roll can allow or permit more possible landing locations and the steeper descent angle means that military aircraft could fly higher over surrounding hostile territory, increasing the safety of operations. By reducing the in-air acceleration and the ground roll distance of an aircraft, the spoiler and flap system of the invention can improve the landing characteristics of an aircraft, which could benefit commercial aircraft, military aircraft, and other areas of aviation.

Example and Results of an Embodiment of the Invention

First Embodiment of an Unmanned Aircraft

Figure 20:
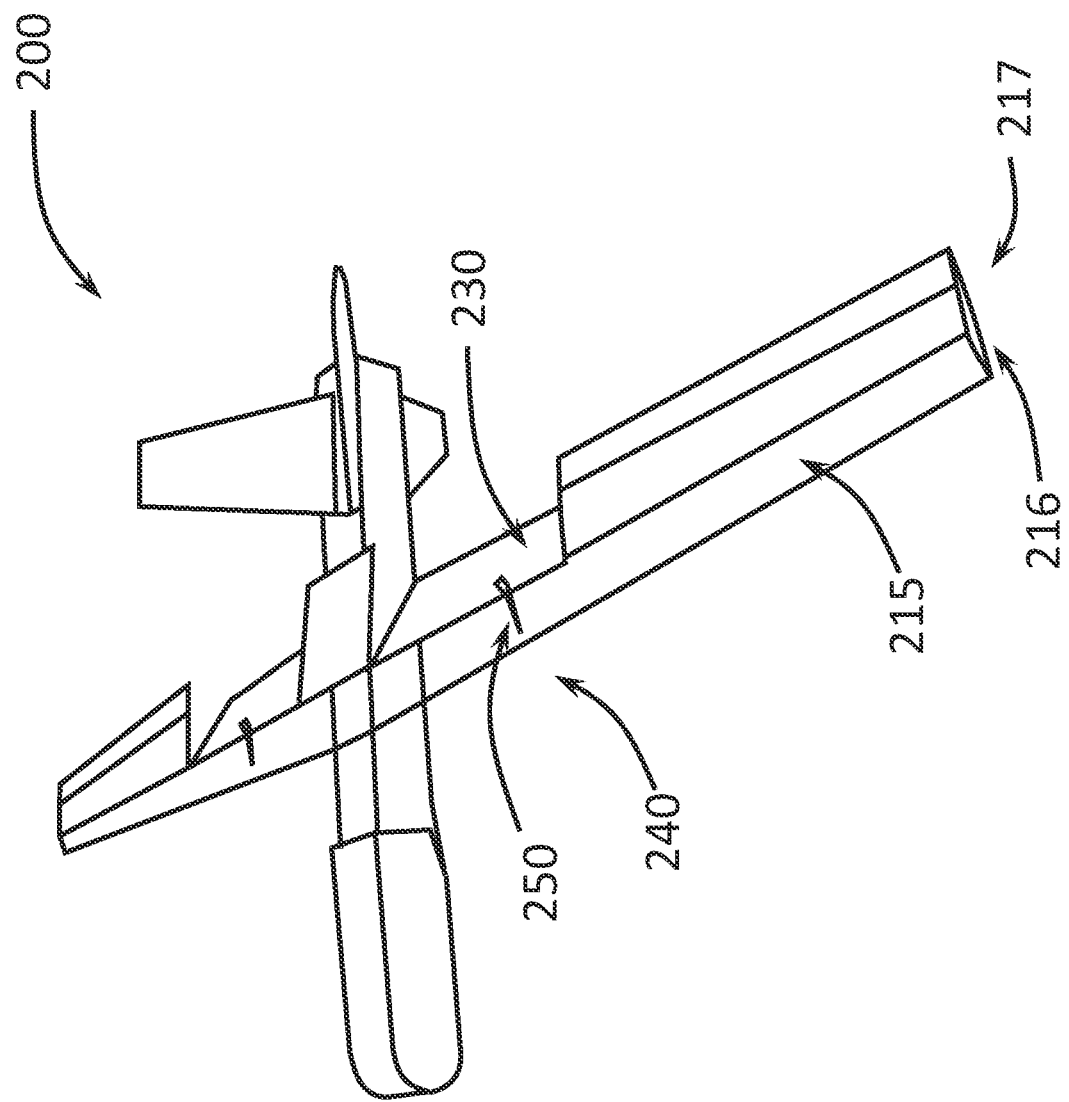
FIG. 20 shows another embodiment of the present invention of a model aircraft with the wing assembly including the spoiler and the flap (not viewable).

FIG. 20 shows the model unmanned aircraft 200 used for experimentation purposes, with the features of the present invention implemented on the model. This model was built using a polystyrene foam board, available for example, from Amazon as Readi-Board™ and was constructed based on design plans available from the Internet at the website Red20RC.org. In this model, the chord span of the spoiler and the flap was about two-thirds the length of the chord line of the airplane wing. The model wing was modified by removing a portion of the upper panel 216 to form a spoiler frame and a portion of the lower panel 217 to form a flap frame, and by reinforcing the front portion 215 with three 7-mm diameter carbon fiber tubes, attached inside that front portion 215, to mitigate the effects of stress that could have occurred (or may occur) at that front portion 215 during flight.

The model unmanned aircraft 200 included a receiver, a transmitter, one servo motor each for the spoiler 230 and the flap 240, and a propeller motor with respect to relevance of the present invention. Additional servo motors can be employed for operation of the ailerons, the ruddervators, and other components of the plane. During operation of the aircraft, the transmitter (based on Spectrum DX7 with a frequency of 2.4 GHz) sends radio signals in the form of pulse width modulation to the receiver which then sends the signals to a respective servo motor(s). A controller integral with the servo motor(s) interprets the received signal, and pivots accordingly the spoiler and the flap to their intended positions. The servo motors had a configuration that could pivot and position the respective spoiler or flap within an arc range of 120° about the neutral position. The propeller had a diameter of 8 inch (20 cm) and a pitch of 4.5 inch (11 cm).

Figure 21:
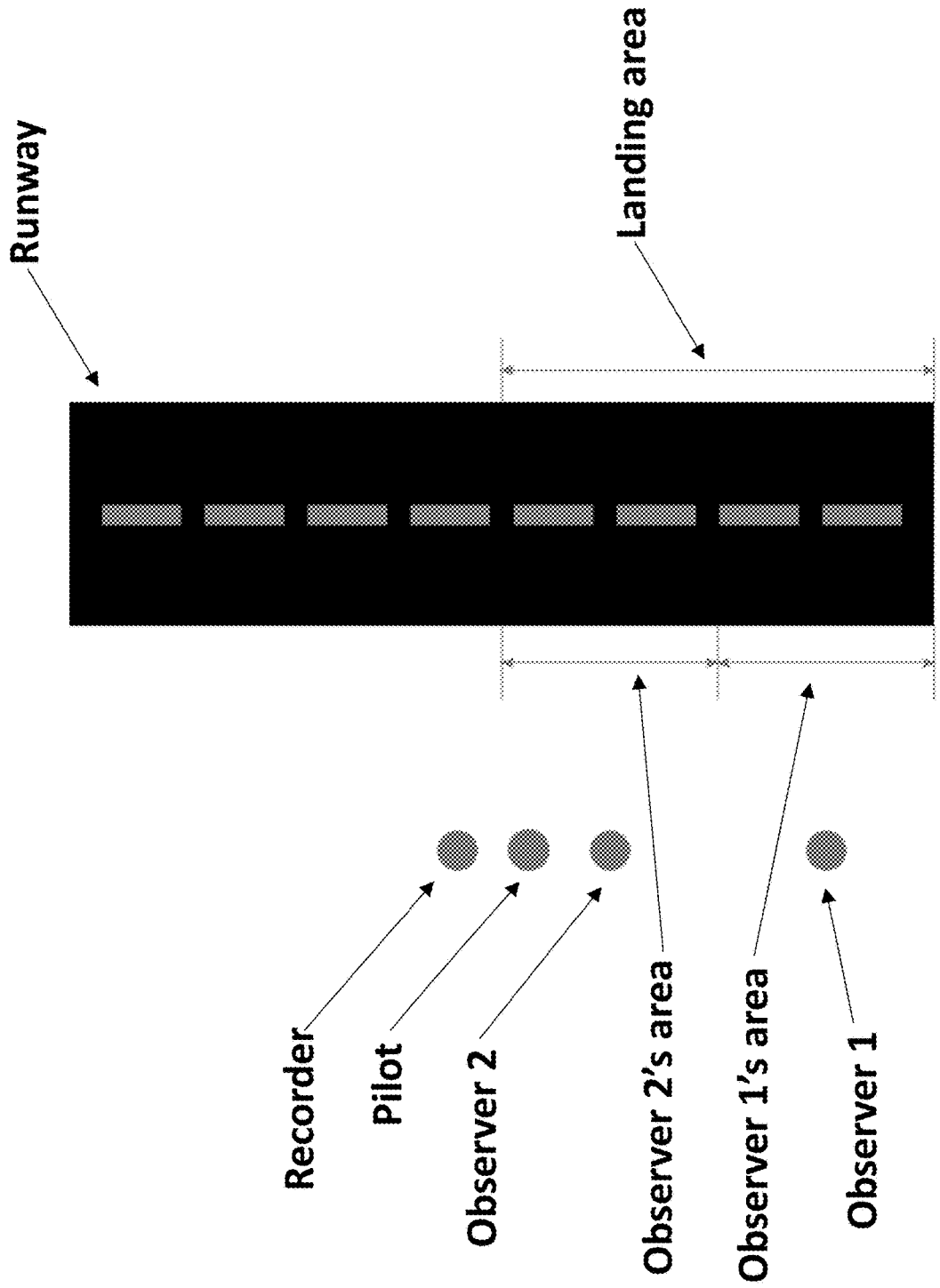
FIG. 21 shows a plan view of the setting used for measuring flight data for the model aircraft of FIG. 20.

FIG. 21 shows the setting used in flight and landing testing of the model unmanned aircraft 200, and in collecting data relevant to the operational benefits of the model aircraft 200. As shown, two observers were positioned on one side of a runway. The observers watched the aircraft operation and marked a first location where the main wheels of the model aircraft 200 touched down on the runway. After the aircraft came to a complete stop, the observers marked a second location where the main wheels stopped, and then measured the distance or ground-roll between the two marked locations. This method was used for collecting landing distances or ground-roll distances. The wind speed was also measured. Specifically, the following operations were performed and the associated landing distance and wind speed data measured and collected: (1) four landings with the spoilers in a neutral position and the flap in neutral position, during landing and ground-roll (see Table 1 below for data); (2) five landings with the spoilers and the flaps in the flap function position, during landing and ground-roll (see Table 2 below for data); and (3) eleven landings with the spoilers and the flaps in the flap function position during landing approach, and in the spoiler-flap function position at touch-down and during ground-roll (see Table 3 below for data).

TABLE 1

Landing Data with the Spoilers and Flaps in Neutral Positions

| S. No. | Distance (ft) | Wind Speed (mph) |
|---|---|---|
| 1 | 65 | 3 |
| 2 | 72 | 4.5 |
| 3 | 56 | 3 |
| 4 | 63 | 4.3 |

TABLE 2

Landing Data with the Spoilers and Flaps in Flap Function Position

| S. No. | Distance (ft) | Wind Speed (mph) |
|---|---|---|
| 1 | 32 | 0 |
| 2 | 38 | 3 |
| 3 | 52 | 3.5 |
| 4 | 40 | 0 |
| 5 | 57 | 0 |

TABLE 3

Landing Data with the Spoilers and Flaps in Flap
Function Position up to Touch-down, and in Spoiler-
Flap Function Position during Ground-roll

| S. No. | Distance (ft) | Wind Speed (mph) |
|---|---|---|
| 1 | 12 | 6 |
| 2 | 17 | 3 |
| 3 | 23 | 0 |
| 4 | 20 | 0 |
| 5 | 16 | 2 |
| 6 | 20 | 3 |
| 7 | 24 | 2.5 |
| 8 | 33 | 3 |
| 9 | 20 | 0 |
| 10 | 44 | 2 |
| 11 | 27 | 2 |

Figure 22:
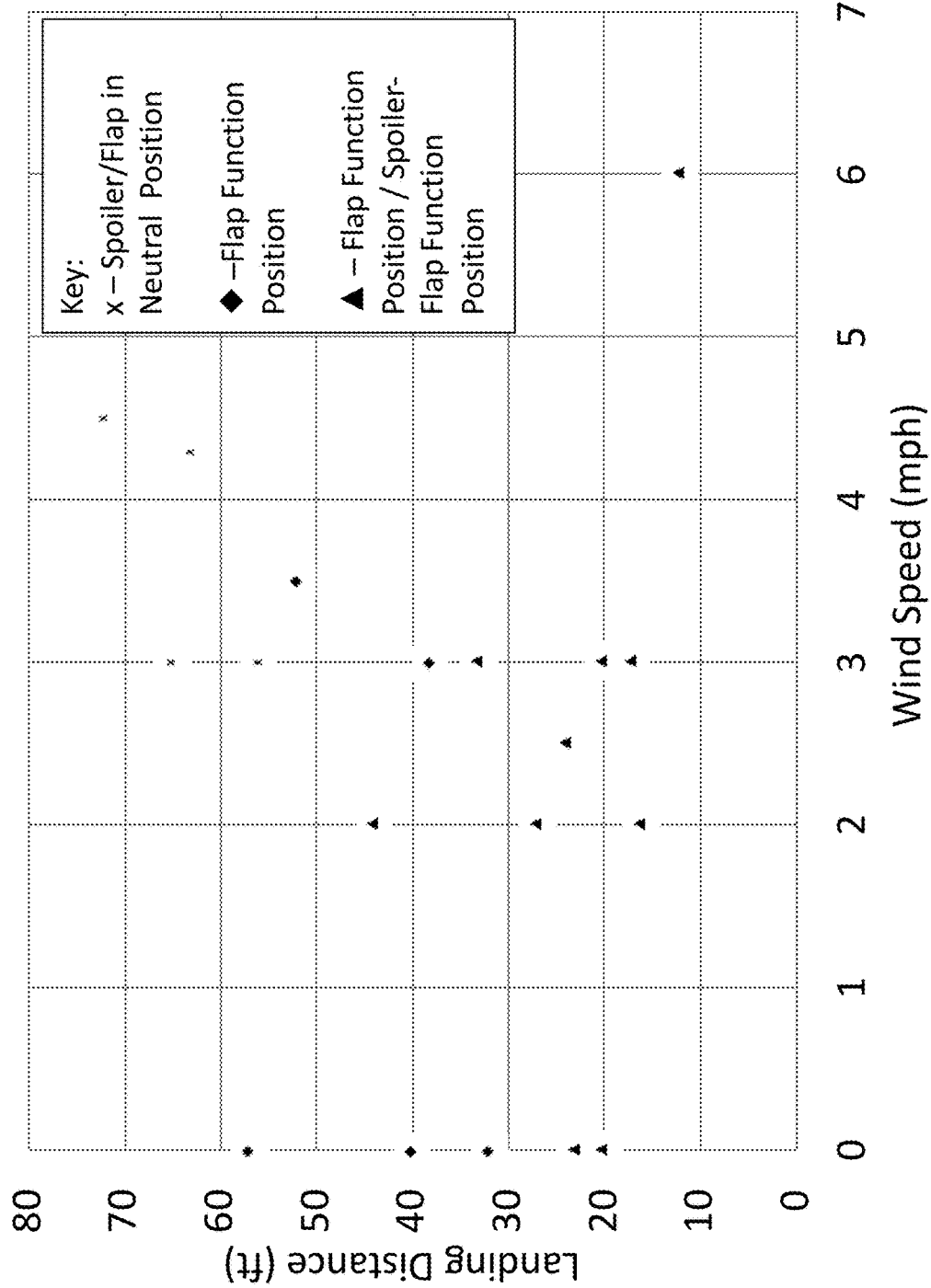
FIG. 22 shows a graph plotting landing distance against wind speed for the flight data.

FIG. 22 shows a graph with the landing distance plotted against the wind speed for the three above-mentioned test conditions. Table 4 below shows the averages and standard deviations for the landing distance and wind speed values obtained.

TABLE 4

Standard Deviations for the Landing Distance and the Wind Speed

| | Landing Distance (ft) | | Wind Speed (mph) | |
|---|---|---|---|---|
| Condition | Average | Standard Deviation | Average | Standard Deviation |
| Spoilers/Flaps Neutral Positions (Table 1) | 64 | 6.58 | 3.8 | 0.81 |
| Flap Function Position (Table 2) | 43.8 | 10.35 | 1.3 | 1.89 |
| Spoiler-Flap Function Position (Table 3) | 23.27 | 8.89 | 2.4 | 1.76 |

Figure 23:
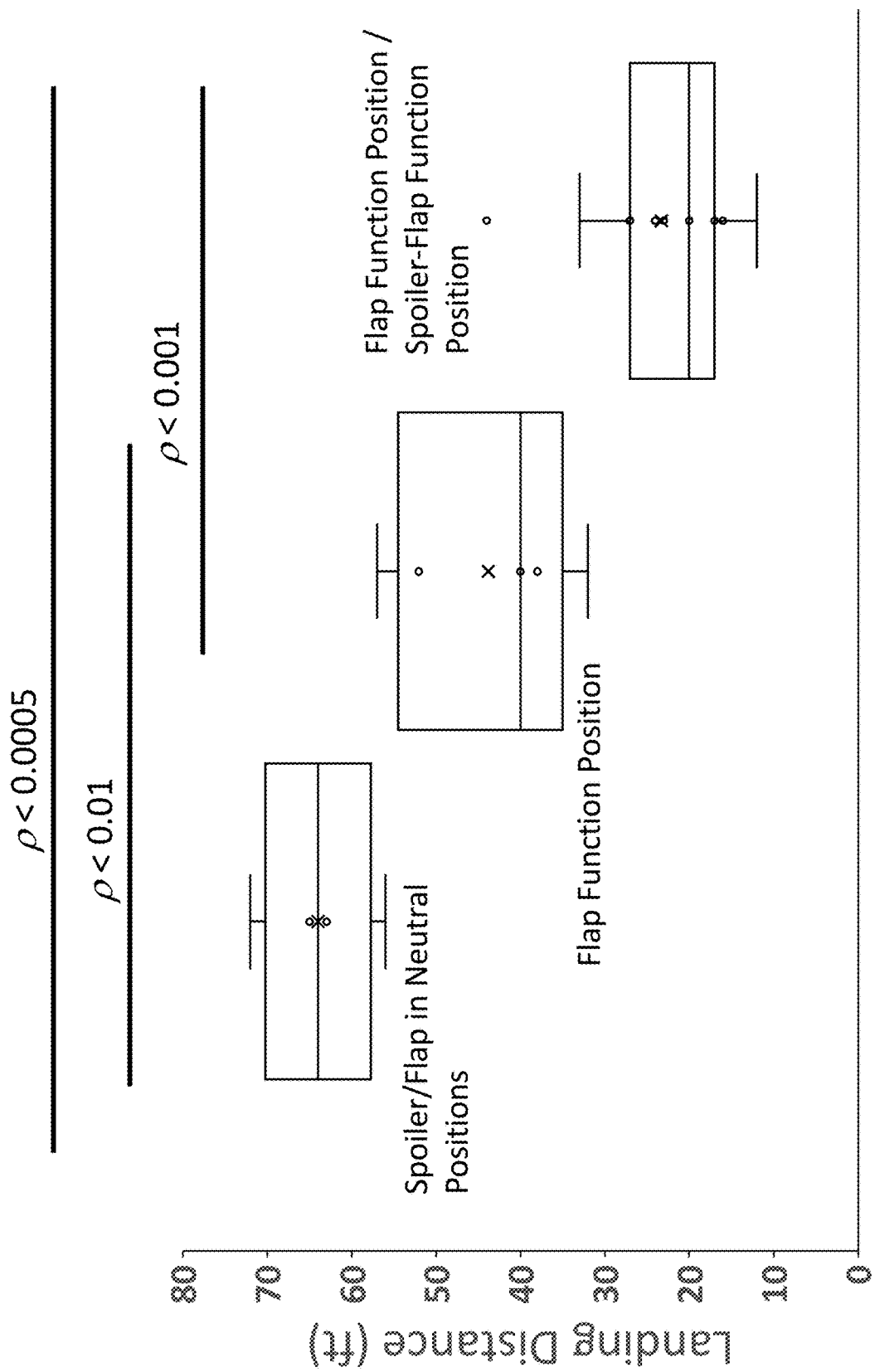
FIG. 23 shows a box and whisker plot of the landing distance data of the model aircraft of FIG. 20, along with probability information for the data.

FIG. 23 shows a box and whisker plot of the landing distance data along with a statistical p value that was computed to assess the statistical significance of the landing distance data. In order to test the statistical significance of the landing results, a favorable hypothesis and a null hypothesis were stated. The three favorable hypotheses are that, from a statistical viewpoint, the difference in landing distances will be significant as between: a conventional wing with the spoiler and flap in the neutral position (operation 1) and a wing having a spoiler and a flap actuated to the flap function position (operation 2); a conventional wing with the spoiler and flap in the neutral position (operation 1) and the spoiler-flap function position (operation 3) of the present invention; and a wing having a spoiler and a flap actuated to the flap function position (operation 2) and the spoiler-flap function position (operation 3). The null hypothesis stated was that there is no difference in the landing distance data. The statistical significance was computed as shown in Table 5 below.

The present invention's spoiler and flap system decreased the ground roll distance of the aircraft by over fifty percent.

The landings of the model in both the flap function position and the spoiler-flap function position were found to be shorter than the landings of the model with the spoiler and flap in the neutral position. Although the flaps used in the model unmanned aircraft 200 are understood to be larger (longer chord length) than conventional flaps, they provide a suitable comparative reference for the landing distance of an aircraft with "conventional" flaps. As seen in FIG. 23, the spoilers and flaps operating in flap function position of the model unmanned aircraft 200 were only half as effective as the combination of the spoilers and flaps operating in the spoiler-flap function position. The spoiler and flap system of the present invention is significantly more effective than conventional flaps systems.

To assess the statistical significance of the data, the independent 2-sample left-tail t-test discussed above was performed on the landing distances of the tested operational conditions. If the computed p value is less than 0.05, the results are statistically significant. As shown in FIG. 23 and in Table 5 below, the results were indeed statistically significant. Thus, the favored hypothesis was found to be true.

The following is a list of explanations of the title and the variables in Table 5, shown below.

"Independent 2-sample" refers to comparing (1) landing distance data for landings without the present invention; and (2) landing distance data for landings with the spoiler and flap system of the present invention, for statistical significance.

"left-tail" refers to comparison as to whether the landing distances associated with the present invention are shorter, and not just whether they are different from the landing distances associated with conventional spoiler and flap systems.

"$H_a$" refers to the favorable hypothesis i.e. the difference between landing distance associated with conventional wings and landing distance associated with the spoiler and flap system of the present invention is statistically significant.

"$H_0$" refers to the null hypothesis i.e. there is no difference between landing distance associated with conventional wings and landing distance associated with the spoiler and flap system of the present invention.

"$\alpha$" refers to alpha level or significance level of the t-test.

"df" refers to the degrees of freedom of the t-test.

"$t\alpha=0.05$, df=13" is the target t-value for the study. A value that is less than this is indicates that the data is statistically significant.

"Sp2" refers to the weighted average variance between the two data sets. Since the variances (variance equals standard deviation squared) of the data sets are different, the Sp2 represents the weighted average variance between the data sets in the t-test equation.

"$t_{ts}$" refers to the calculated t-test value for the data sets.

TABLE 5

Independent 2-sample left-tail t-test calculation $H_a$: $\mu_{with\ disclosed\ invention} < \mu_{without\ the\ disclosed\ invention}$
$H_0$: $\mu_{with\ disclosed\ invention} = \mu_{without\ disclosed\ invention}$
$\alpha = 0.05$
df = $n_{with} + n_{without} - 2 = 11 + 4 - 2 = 13$
$t_{\alpha=0.05,\ df=13} = -1.77$ $$Sp^2 = \frac{(n_{with} - 1)S^2_{with} + (n_{without} - 1)S^2_{without}}{n_{with} + n_{without} - 2} = \frac{(10)8.9^2 + (3)6.6^2}{13} = 71$$

$$t_{ts} = \frac{\bar{X}_{with} - \bar{X}_{without}}{\sqrt{Sp^2\left(\frac{1}{n_{with}} + \frac{1}{n_{without}}\right)}} = \frac{23.27 - 64}{\sqrt{71\left(\frac{1}{11} + \frac{1}{4}\right)}} = -8.3$$

Given:
$t_{ts} = -8.3$
df = 13

TABLE 5-continued

Independent 2-sample left-tail t-test calculation

Then:
$p < 0.0005$
Since $t_{ts} < t_{\alpha=0.05,\ df=13}$ and $p < \alpha$, reject $H_0$.

Second Embodiment of an Unmanned Aircraft

Figure 24:
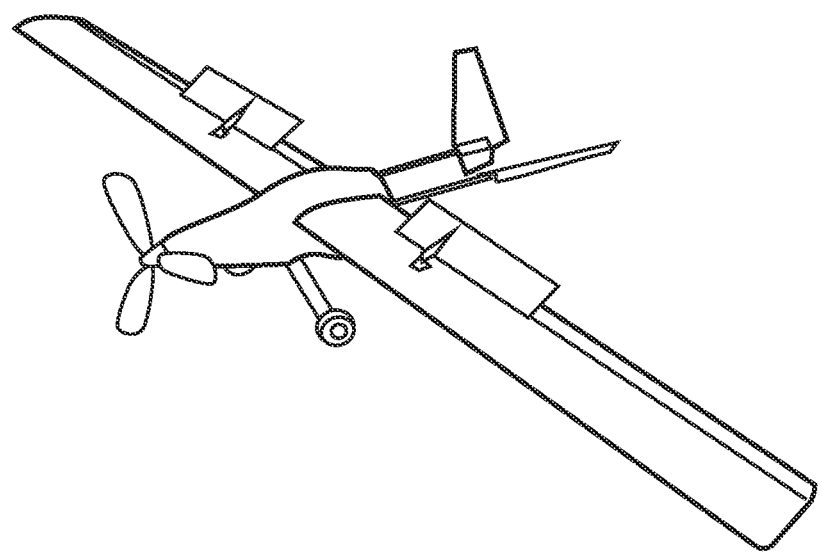
FIG. 24 shows another embodiment of a model aircraft with the wing assembly including the spoiler and the flap.

In a second embodiment, a different model aircraft shown in FIG. 24 was employed and modified as described below. The different model with the modification allowed for the aircraft to carry a flight recording device (Pixhawk 2.1) to measure real-time, in-flight parameters including velocity, acceleration, and pitch.

Aside from the metal landing gear, the fuselage and tail of the aircraft was constructed primarily out of G10 and carbon fiber composites to withstand the forces of takeoff, flight, and landing. For the wing, a combination of foam, fiberglass, and carbon fiber was used. By covering the foam wing core with fiberglass and constructing the main spar out of carbon fiber, the wing became aerodynamic, light, and robust. The spoiler and flap system of the present invention, including the spoilers and flaps, and their respective frames, occupied only 45% of the wing chord line.

In this embodiment, the control system consisted of several individual components. The on-board receiver interprets the 2.4 GHz radio signals from the ground-based transmitter (Spectrum DX7) and sends the signals to the propulsion motor and system drive servos in the form of pulse width modulation (PWM) for each control input, namely the throttle, ailerons, elevators, rudders, flaps, and spoilers. The servos interpret the signals and turn their control arms to the desired angle within a one hundred twenty-degree arc, as capable. The control arms of the flap servo and spoiler servo are connected to the corresponding control surfaces by a stiff wire to drive the respective control surface to a corresponding angular position. The propulsion motor and propeller create thrust, for take-off and sustained flight. In this embodiment, the propulsion motor was mounted to the front of the fuselage, driving a nose-mounted propeller. The electronic speed controller (ESC) converts the DC current coming from the 14.8 v lithium-ion polymer (lipo) battery, into 3-stage AC current, at a selected frequency based upon a desired rotations per minute (RPM) of the propulsion motor.

With the ability to carry a flight data recorder, this aircraft embodiment was used to conduct a series of in-flight tests to measure and compare the features of the spoiler and flap system on aircraft performance, and specifically on deceleration of the aircraft in flight.

Ordinarily, the systems would be tested and compared by sustaining a consistent and repeatable velocity and rate of acceleration of the aircraft, while simultaneously deploying the members of the spoiler and flap system, and measuring the resulting speed, reduction in acceleration, and deceleration. However, this embodiment, propelled by a battery, could not be relied upon to perform a series of tests, during one flight, at consistent and repeatable velocity and rate of acceleration, due to battery drain.

Figure 25:
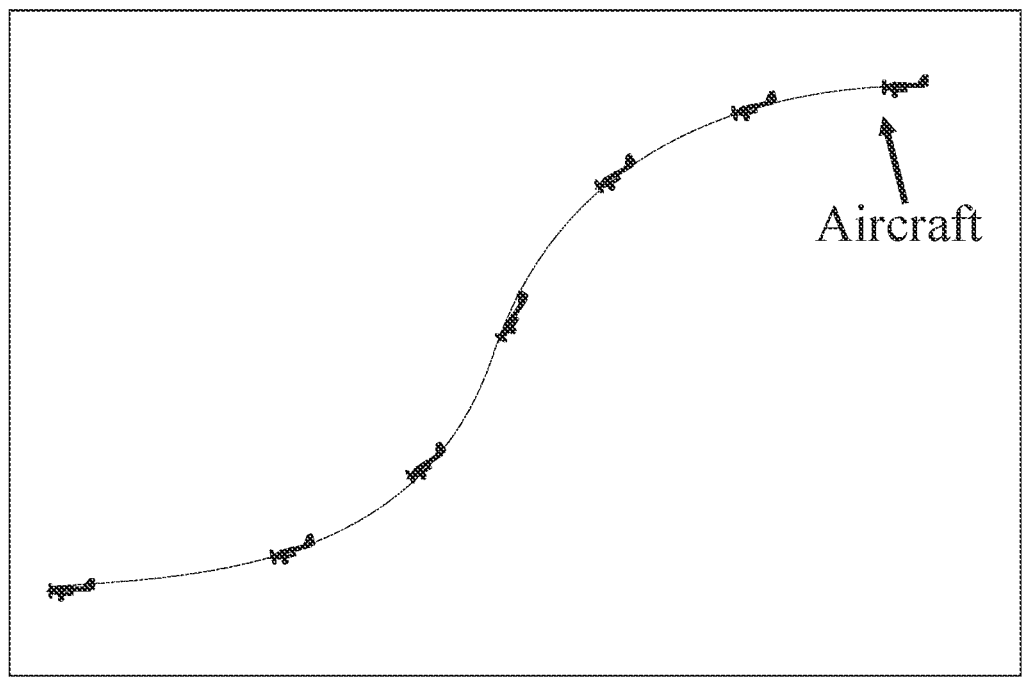
FIG. 25 shows a time-lapse illustration of an aircraft entering a dive, diving at zero throttle, and pulling out of the dive.

As an alternative means for affecting a sufficient and consistent velocity and acceleration, the force of gravity was used. Gravity is both powerful and constant. The test plan was to fly the airplane manually to a suitable elevation and level off the flight, pointed into any wind, at a constant air speed. The throttle of the aircraft was then reduced to zero, and the aircraft was pitched into a dive at zero thrust and at a preselected pitch angle, allowing gravity to provide a sufficient and consistent acceleration to the aircraft. Then during the dive, at a predetermined pitch angle, the spoiler and flap system were deployed to effect either the spoiler function, the flap function, or the spoiler-flap function. Each spoiler and flap system condition was run one or more times, at each of a series of increasing pitch angles, and compared against the same conditions with the spoilers and flaps in normal flight (the control condition). The pitch angles used were 10, 20, 30, 40 50 and 60 degrees. Each condition and pitch angle was tested, and data recorded, five times. After collection of data, the pitch of the aircraft was decreased and the flight path leveled off. A time-lapse illustration of an aircraft entering the dive, diving at zero throttle, and pulling out of the dive, is shown in FIG. 25.

To assess if electronic noise from the various servo motors might have interfered with the flight data recordings, the aircraft was placed in a stationary position for 1.8 minutes while the servos were actuated to simulate the electronic noise during the flights, and the sensor data was recorded for that test. No substantial interference was determined to exist.

During testing, there was no noticeable wind, and atmospheric conditions were unchanged. For each of the control condition and the three spoiler-flap conditions, five flight passes were conducted at each of the six pitch test angles. After the data was collected, the logs from the flight recorder were downloaded into an Excel file, and the data for each pitch down pass was isolated. Subsequently, a Python program was written to parse out the relevant data and organize it into a usable format. The flight recorder factors the acceleration of gravity into the determined acceleration result. Since the aircraft was pitched downwards during the flight passes, the effect of gravity on the acceleration readings increases as the aircraft's downward pitch angle increased. This skews the data by including both linear acceleration of the aircraft (which is our target data), and the acceleration of gravity due to pitch angle. To correct for this, the acceleration readings were normalized by taking the acceleration reading ($Acc_X$) and adding the acceleration due to gravity times the cosine of the complementary angle ($\theta$) of the pitch angle (complementary angle=90−pitch angle):

$$Acc_X + \left(9.8 \frac{m}{\sec^2} \times \cos \theta \right).$$

The accuracy of the aircraft pitch sensor was found to be ±0.068 degrees and the accuracy of the acceleration in the X dimension (forward and backward) was found to be ±0.026 m/sec².

Figure 26:
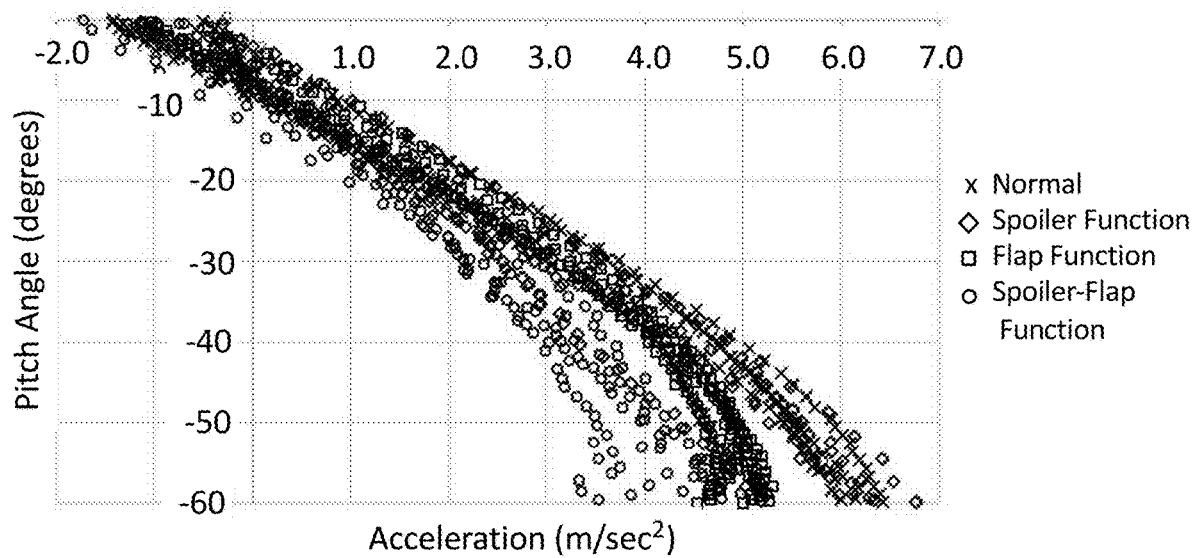
FIG. 26 shows the results of testing of the aircraft of FIG. 24, through a series of dives at zero throttle and a dive angle, and the effects of the spoiler and flap system on reduction of acceleration for each of the spoiler function position, flap function position, and spoiler-flap function position.
Figure 27:
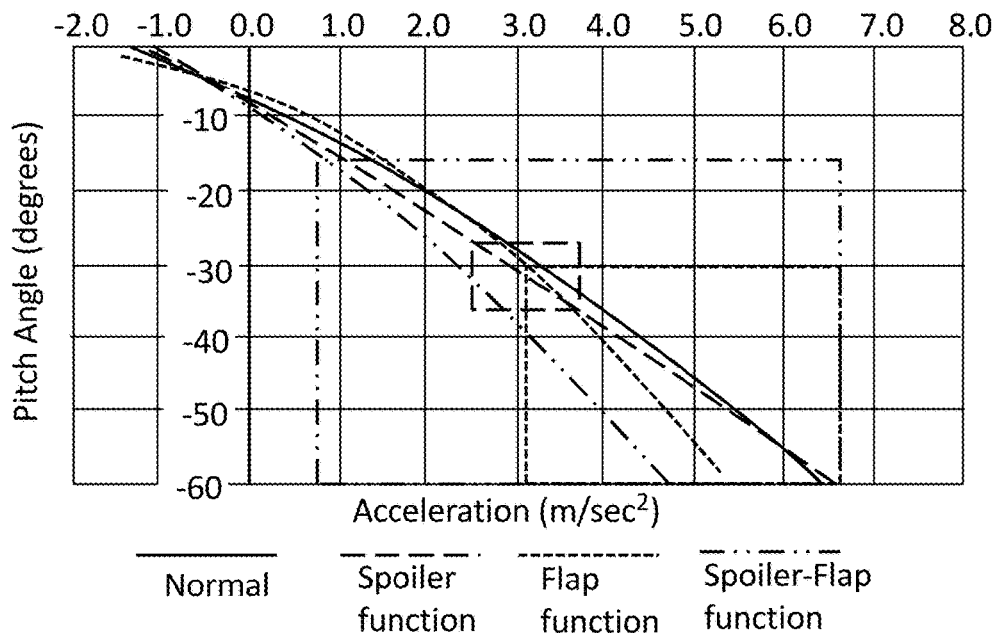
FIG. 27 shows the trend lines for the test results of FIG. 26.

A graph of the pitch angle and corresponding normalized acceleration for each system condition is shown in FIG. 26. The trend lines of the data are shown in FIG. 27. The trend lines are accurate representations of the datasets since all of trend lines have an $R^2$ value of greater than 0.94.

To assess the statistical significance of the data, independent 2-sample left-tail t-tests were conducted comparing the neutral position dataset to the flap, spoiler, and airbrake position datasets, respectively, at different pitch degrees (see Appendix E). Only portions of datasets having statistical significance were used to calculate the percent differences in acceleration between different positions. First, the average of the normalized acceleration for each position was calculated in five-degree intervals. To find the percent difference, the mean of the flap, spoiler, and airbrake position ($\bar{x}_{Flap}$ or $\bar{x}_{Spoiler}$ or $\bar{x}_{Airbrake}$) for each five-degree interval were individually divided by the mean of the neutral position ($\bar{x}_{Neutral}$) at the respective interval. This was subtracted from one and the result was multiplied by one hundred:

$$\left(1 - \frac{\bar{x}_{Flap} \text{ or } \bar{x}_{Spoiler} \text{ or } \bar{x}_{Airbrake}}{\bar{x}_{Neutral}}\right) \times 100$$

Figure 28:
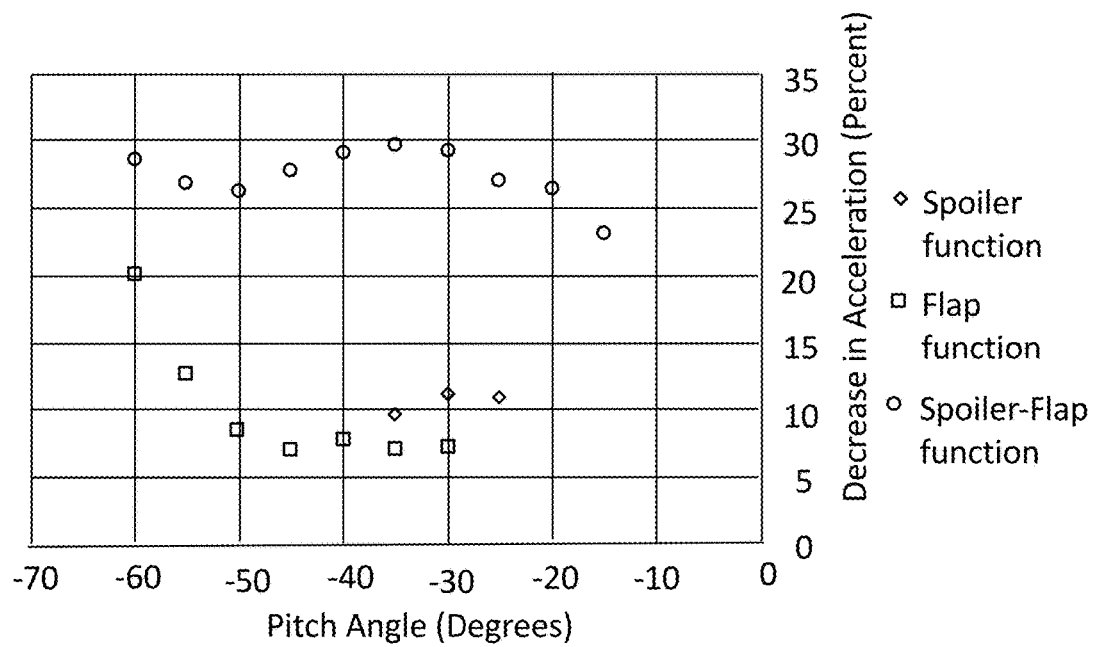
FIG. 28 shows the percent difference in decrease in acceleration for each of the spoiler function position, flap function position, and spoiler-flap function position, compared to the neutral position.

For the spoiler function position, flap function position, and spoiler-flap function position datasets, the area where the dataset is statistically significant from the neutral position dataset ($p<0.05$) is also denoted by the corresponding lined boxes in FIG. 27. The spoiler function position dataset was not statistically different from the neutral position dataset except at the thirty degrees downward pitch condition. The percent difference in reduction in acceleration compared to the neutral position is shown in FIG. 28.

The trend lines reveal that the spoiler-flap function position had the most effect on aircraft deceleration (less than 1 m/sec$^2$ acceleration), an initial sign of significance. The t-tests determined that the spoiler-flap function position dataset is statistically significant ($p<0.05$) from the neutral position at downward pitch angles greater than fifteen degrees. The flap function position dataset becomes statistically significant at downward pitch angles greater than thirty degrees (roughly 3-4 m/sec$^2$ acceleration), and the spoiler function position dataset is only statistically significant at a downward pitch angle of thirty degrees. The datasets suggest that flap function position and spoiler-flap function position reduced the acceleration of the aircraft compared to the neutral position, which simulates a normal wing. Furthermore, compared to flap function position, the spoiler-flap function position had a greater reduction in the aircraft's acceleration. FIGS. 26 and 27 show a comparison between the function positions to deaccelerate the aircraft, compared to the normal flight conditions with the spoiler and flap in their neutral position. The spoiler-flap function position is 13 percent more effective than the flap function position at deaccelerating the aircraft, at linear aircraft acceleration rates of about 4-5 m/sec$^2$ (determined at downward pitch angles between fifty and sixty degrees), and 21 to 26 percent more effective at linear aircraft acceleration rates of about 4 m/sec$^2$ or less (determined at downward pitch angles less than fifty degrees). These results show that the spoiler-flap function position significantly reduces the in-air acceleration of the aircraft, even when compared to the flap function position, and suggests that the spoiler-flap function position is more effective than the flaps operating on conventional, current day aircraft at reducing the in-air acceleration of an aircraft.

Figure 29:
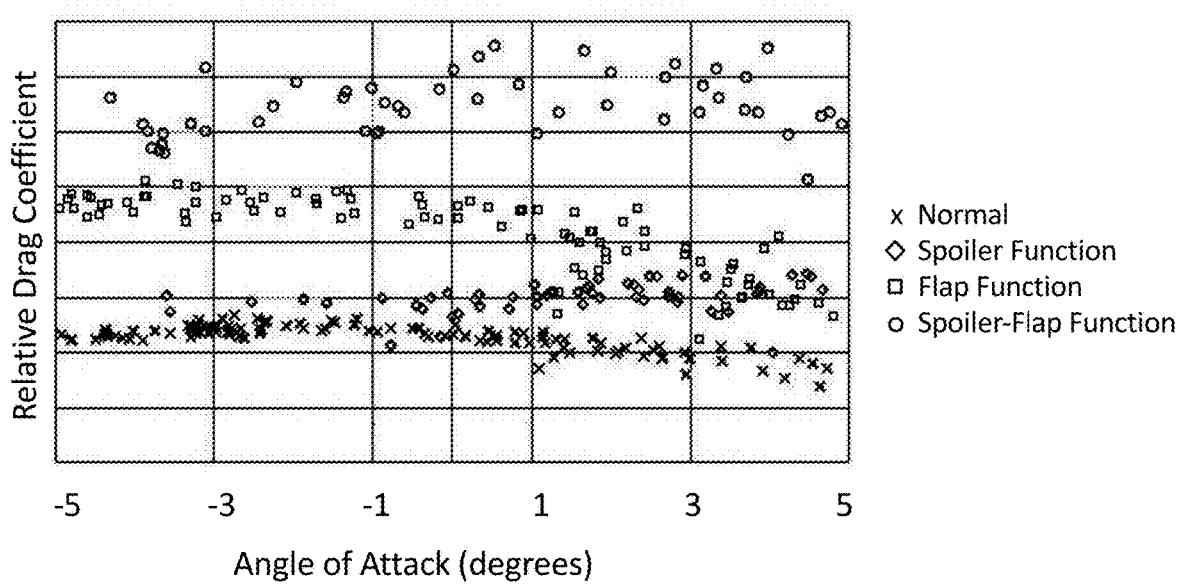
FIG. 29 shows the plots of the angle of attack of the wing and the corresponding calculated relative drag coefficient, for the aircraft for each of the datasets for the spoiler function position, flap function position, spoiler-flap function position, and neutral position Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout the specification. Any features from any example may be included with, a replacement for, or otherwise combined with other features from other examples.

The datasets for the spoiler function, flap function, spoiler-flap function position, and normal positions are also plotted in FIG. 29 for the angle of attack of the wing and the corresponding relative drag coefficient. The angle of attack (AOA) of the aircraft is the angle between the wing and the velocity of the surrounding air. The drag coefficient was calculated from the measured forward acceleration, pitch angle, and velocity of the aircraft. The expected acceleration, assuming no force due to drag, for the respective pitch angle was subtracted from the measured acceleration. The result was multiplied by the mass of the aircraft and divided by the velocity squared, to provide a relative drag coefficient. The aircraft's drag reference area and the air density were considered constant and were not factored into the equation. Subsequently, the resulting relative drag coefficient do not have a numerical significance other than comparing these four datasets for the neutral position, flap function position, spoiler function position, and spoiler-flap function position.

I claim:
1. A wing assembly for an unmanned, light-weight, high endurance aircraft, configured for reduced aircraft take-off and landing distances, the wing assembly comprising:
   an airplane wing including an upper surface with a spoiler frame, a lower surface with a flap frame, a spoiler hinge disposed along a forward edge of the spoiler frame, and a flap hinge disposed along a forward edge of the flap frame;
   a spoiler including a control surface, an interior surface, a forward hinge edge, an inboard lateral edge, an outboard lateral edge, and a trailing edge, the spoiler hingedly connected at the forward hinge edge to the spoiler hinge of the airplane wing for pivoting the spoiler within the spoiler frame, wherein the spoiler is configured for movement between a neutral position at which the spoiler control surface is coextensive with the upper surface of the airplane wing, an active spoiler position at which the spoiler has been pivoted outwardly away from a camber line of the airplane wing, and a passive flap position at which the spoiler has been pivoted inwardly toward the camber line of the airplane wing and through the flap frame;
   a spoiler actuator disposed within the airplane wing, comprising a servo motor that positions an actuator arm that is connected to the spoiler, to move the spoiler between the neutral position, the active spoiler position and the passive flap position;
   a flap including a control surface, an interior surface, a forward hinge edge, an inboard lateral edge, an outboard lateral edge, and a trailing edge, the flap hingedly connected at the forward hinge edge to the flap hinge of the airplane wing for pivoting the flap within the flap frame, wherein the flap is configured for movement between a neutral position at which the flap control surface is coextensive with the lower surface of the airplane wing, an active flap position at which the flap has been pivoted outwardly away from the camber line of the airplane wing, and a passive spoiler position at which the flap has been pivoted inwardly toward the camber line of the airplane wing and through the spoiler frame;
   a flap actuator disposed within the airplane wing, comprising a servo motor that positions an actuator arm that is connected to the flap, to move the flap between the neutral position, the active flap position and the passive spoiler position; and
   wherein each of the servo motors of the spoiler actuator and the flap actuator are controlled remotely by a remote-control system or a radio control system, to effect unmanned control of the spoiler and the flap; and
   wherein the control surface of the spoiler and the control surface of the flap occupy at least one-half the length of the chord line of the airplane wing.

2. The wing assembly according to claim 1, wherein the spoiler and the flap are configured for movement to at least one of:
   (i) a spoiler function position, at which the spoiler has been pivoted outwardly to the active spoiler position and the flap has been pivoted inwardly to the passive spoiler position;

(ii) a flap function position, at which the flap has been pivoted outwardly to the active flap position and the spoiler has been pivoted inwardly to the passive flap position; and (iii) a spoiler-flap function position, at which the spoiler has been pivoted outwardly to the active spoiler position and the flap has been pivoted outwardly to the active flap position.

3. The wing assembly according to claim 1, wherein the spoiler and the flap are configured for movement to at least one of (i) the spoiler function position, (ii) the flap function position, and (iii) the spoiler-flap function position.

4. The wing assembly according to claim 1, wherein the spoiler is configured for movement to the active spoiler position from the neutral position through a pivot angle of up to about 90 degrees, and the flap is configured for movement to the active flap position from the neutral position through a pivot angle of up to about 90 degrees.

5. The wing assembly according to claim 1, wherein the wing assembly is made from one or more materials selected from the group consisting of aluminum and its alloys, steel and its alloys, a composite material, a polymeric material, a thermoplastic material, and a combination thereof.

6. The wing assembly according to claim 1, wherein in the neutral position, the trailing edge of the spoiler overlaps the trailing edge of the flap and defines a trailing edge of the airplane wing.

7. The wing assembly according to claim 1, wherein the control surface of the spoiler and the control surface of the flap occupy at least two-thirds the length of the chord line of the airplane wing.

8. The wing assembly according to claim 1, wherein the control surface of the spoiler and the control surface of the flap occupy up to three-quarters the length of the chord line of the airplane wing.

9. A method to reduce runway time for an aircraft during landing, the method comprising the step of:
providing an unmanned high endurance aircraft comprising a wing assembly according to claim 1;
after the aircraft touches down on the runway, performing at least one step of: (i) positioning a flap to a passive spoiler position and a spoiler to an active spoiler position; and (ii) positioning the flap to an active flap position and the spoiler to an active spoiler position;
wherein the aircraft's wings are made of an airfoil assembly comprising an airplane wing, the spoiler, and the flap;
wherein the spoiler has a control surface that is coextensive with an upper surface of the airplane wing, and the flap has a control surface that is coextensive with a lower surface of the airplane wing; and
wherein the control surface of the spoiler and the control surface of the flap occupy at least one-third the length of a chord line of the airplane wing.

10. The method according to claim 9, wherein:
an angle of attack of the flap in the passive spoiler position with respect to the chord line of the airfoil assembly is in the range between 0°--90°; and
an angle of attack of the spoiler in the active spoiler position with respect to the chord line of the airfoil assembly is in the range between 0°-+90°.

11. The method according to claim 10, further comprising the step of: as the aircraft in flight approaches a runway, simultaneously positioning a flap to an active flap position and a spoiler to a passive flap position.

12. The method according to claim 11, wherein:
as the aircraft in flight approaches the runway, an angle of attack of the flap in the active flap position with respect to the chord line of the airfoil assembly is in the range between 0°-+90°; and
an angle of attack of the spoiler in the passive flap position with respect to the chord line of the airfoil assembly is in the range between 0°--90°.

13. The method according to claim 9, wherein:
an angle of attack of the flap in the active flap position with respect to the chord line of the airfoil assembly is in the range between 0°-+90°; and
an angle of attack of the spoiler in the active spoiler position with respect to the chord line of the airfoil assembly is in the range between 0°-+90°.

14. The method according to claim 13, further comprising the step of: as
the aircraft in flight approaches a runway, simultaneously positioning a flap to an active flap position and a spoiler to a passive flap position.

15. The method according to claim 9, wherein:
as the aircraft approaches a take-off point from taxi, positioning a flap to an active flap position and a spoiler to a passive flap position.

16. The method according to claim 15, wherein in the step:
an angle of attack of the flap in the active flap position with respect to the chord line of the airfoil assembly is in the range between 0°-+90°; and
an angle of attack of the spoiler in the passive flap position with respect to the chord line of the airfoil assembly is in the range between 0°--90°.

17. A method to reduce in-flight aircraft acceleration effected by gravity during flight, the method comprising the steps of:
(i) providing an aircraft in flight, the aircraft having wing assemblies comprising the spoiler and flap system according to claim 1;
(ii) pitching the aircraft into a dive that accelerates the aircraft due to gravity;
(iii) deploying the spoiler and flap system to effect at least one of the spoiler function, the flap function, and the spoiler-flap function, thereby reducing the acceleration of the aircraft due to gravity.

18. The method according to claim 17, wherein the method is used to effect a steeper descent angle while approaching a runway during landing.

19. A wing assembly for high endurance aircraft, the wing assembly comprising:
an airplane wing including an upper surface with a spoiler frame, a lower surface with a flap frame, a spoiler hinge disposed along a forward edge of the spoiler frame, and a flap hinge disposed along a forward edge of the flap frame;
a spoiler including a control surface, an interior surface, a forward hinge edge, an inboard lateral edge, an outboard lateral edge, and a trailing edge, the spoiler hingedly connected at the forward hinge edge to the spoiler hinge of the airplane wing for pivoting the spoiler within the spoiler frame, wherein the spoiler is configured for movement between a neutral position at which the spoiler control surface is coextensive with the upper surface of the airplane wing, an active spoiler position at which the spoiler has been pivoted outwardly away from a camber line of the airplane wing, and a passive flap position at which the spoiler has been pivoted inwardly toward the camber line of the airplane wing and through the flap frame;

a flap including a control surface, an interior surface, a forward hinge edge, an inboard lateral edge, an outboard lateral edge, and a trailing edge, the flap hingedly connected at the forward hinge edge to the flap hinge of the airplane wing for pivoting the flap within the flap frame, wherein the flap is configured for movement between a neutral position at which the flap control surface is coextensive with the lower surface of the airplane wing, an active flap position at which the flap has been pivoted outwardly away from the camber line of the airplane wing, and a passive spoiler position at which the flap has been pivoted inwardly toward the camber line of the airplane wing and through the spoiler frame, wherein in the neutral position, the trailing edge of the spoiler overlaps the trailing edge of the flap and defines a trailing edge of the airplane wing.

* * * * *